United States Patent
Takeuchi et al.

(10) Patent No.: US 7,215,320 B2
(45) Date of Patent: May 8, 2007

(54) HAPTIC INTERFACE DEVICE

(75) Inventors: Shin Takeuchi, Ashigarakami-gun (JP); Kazuyuki Tsukamoto, Ashigarakami-gun (JP); Katsumi Sakamaki, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 770 days.

(21) Appl. No.: 10/378,860

(22) Filed: Mar. 5, 2003

(65) Prior Publication Data

US 2004/0095369 A1 May 20, 2004

(30) Foreign Application Priority Data

Nov. 18, 2002 (JP) ............................ 2002-334324

(51) Int. Cl.
*G09G 5/00* (2006.01)

(52) U.S. Cl. ....................................... 345/156; 345/157

(58) Field of Classification Search ................ 345/156, 345/157, 161, 163, 167, 168
See application file for complete search history.

(56) References Cited

U.S. PATENT DOCUMENTS

| | | | |
|---|---|---|---|
| 6,580,417 B2 * | 6/2003 | Rosenberg et al. | 345/157 |
| 6,933,920 B2 * | 8/2005 | Lacroix et al. | 345/156 |
| 6,982,700 B2 * | 1/2006 | Rosenberg et al. | 345/157 |
| 2006/0007184 A1 * | 1/2006 | Rosenberg et al. | 345/173 |
| 2006/0187201 A1 * | 8/2006 | Rosenberg et al. | 345/156 |

FOREIGN PATENT DOCUMENTS

| | | |
|---|---|---|
| JP | A 9-244866 | 9/1997 |
| JP | A 10-293644 | 11/1998 |
| JP | A 2000-330688 | 11/2000 |
| JP | A 2002-109558 | 4/2002 |

* cited by examiner

*Primary Examiner*—Ricardo Osorio
(74) *Attorney, Agent, or Firm*—Oliff & Berridge PLC

(57) ABSTRACT

A haptic interface device includes a detection section for detecting the state of operation on an operating section performed by an operator or the position of the operating section and outputting a signal indicating the detected state or position; a driving section for electromagnetically driving the operating section to provide a reaction force to the operator; and a control section for controlling the driving section according to the signal output from the detection section and based on interface definition information in which is defined specification information for the operating section to behave as an interface apparatus. The control section produces a reaction force corresponding to the operation performed by the operator to provide an operational feeling that would be produced by the interface apparatus behaved by the operating section when operated. Thus, the haptic interface device provides operational feelings associated with various operations to the operator through their sense of touch with a single operation member.

14 Claims, 23 Drawing Sheets

OUTPUT ALONG EACH AXIS
WHEN JOYSTICK IS OPERATED

TOGGLE SWITCH OPERATION

OUTPUT ALONG EACH AXIS
WHEN TOGGLE SWITCH IS OPERATED

OPERATION
WHEN DETERMINED AS BEING ON

OUTPUT ALONG EACH AXIS
WHEN DETERMINED AS BEING ON

OPERATION
WHEN DETERMINED AS BEING OFF

OUTPUT ALONG EACH AXIS
WHEN DETERMINED AS BEING OFF

SIDE ELEVATION VIEW

PLAN VIEW

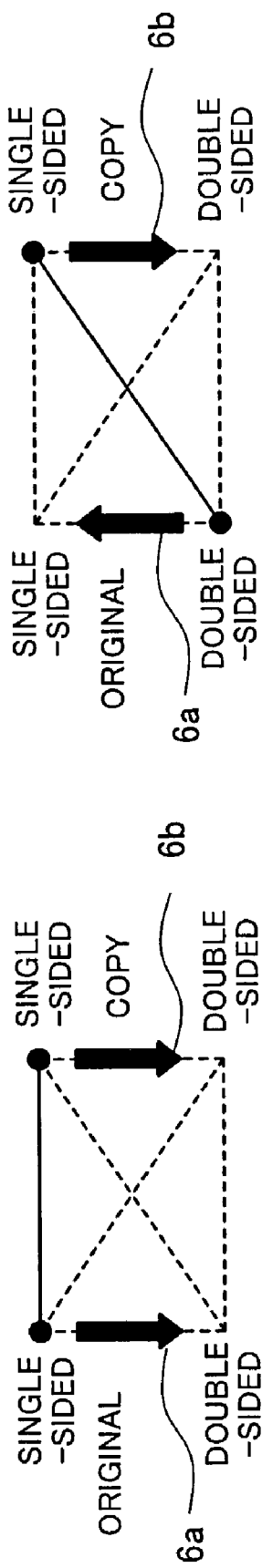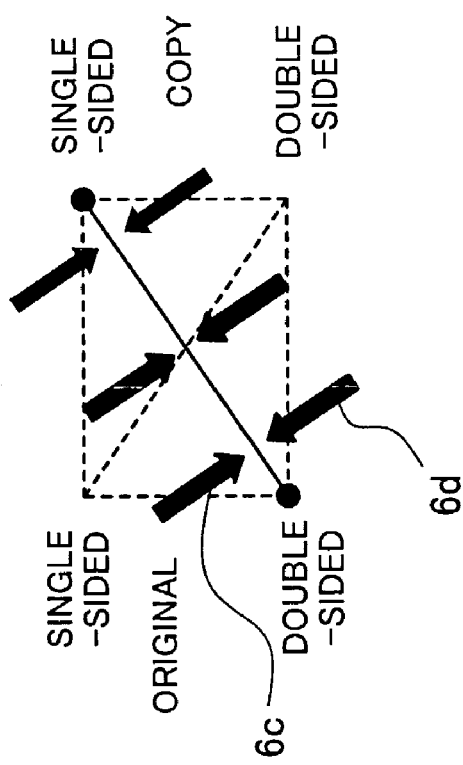
FIG. 23A
FIG. 23B
FIG. 23C

HAPTIC INTERFACE DEVICE

BACKGROUND OF THE INVENTION

1. Field of the Invention

The present invention generally relates to a haptic interface device, and more particularly to an apparatus capable of providing various types of operational sensations such as a sense of resistance that can be obtained when operating an interface apparatus, or operational sensations of various interface apparatuses such as a joystick and toggle switch through a single operating member.

2. Description of the Related Art

Electric and electronic devices typically contain interface components such as toggle switches, jog dials, and sliding switches, for switching device functions or issuing instructions to the devices. Information devices may also have interfaces such as a typical joystick or track ball. These interface apparatuses are designed to use the restitution force of an elastic material such as a spring or rubber to provide an operational sensation to an operator in order to help the operator perceive that switching of functions of these devices and instructions provided to them have been properly input.

However, these methods in which such an elastic material is used inherently has the problem that an intended reaction force cannot be provided due to degradation of or damage to the elastic material or its supporting portion which is caused by a pressure inevitably exerted on an operating section by the operator.

Furthermore, recent electric and electronic devices have increasingly sophisticated and complicated functions. Consequently, not all the functions are provided on their operation panel. Therefore, more than one function is assigned to a single switch and the function is selected by switching of mode. However, the switch operated does not necessarily provide an operator with an optimum operational feeling for indicating to the operator that the function switching has bee performed. Another problem is that operational feeling of interface apparatuses is traded off for more sophisticated and complicated functionality. For example, interface apparatuses that provide no operational feeling, such as touch panels, are used.

In order to solve these problems, a number of inventions have been made. For example, a technology has been disclosed in which a rotating knob-type operating section can be moved horizontally to select a function while force feedback control is being applied to the knob in its rotation direction to provide the operator an operational sensation corresponding to the function (see Japanese Patent Laid-Open Publication No. 2002-109558). In another technology, the degree-of-freedom of an operating section that can move in three axes, x, y, and z, is restricted according to a function selected by using a voice instruction in order to make the selection of the function easier to perceive (see Japanese Patent Laid-Open Publication No. Hei 9-244866). Yet another technology has been disclosed in which a touch panel itself is vibrated to present a click feeling to the operator in order to make an operation on the touch panel easier to perceive (see Japanese Patent Laid-Open Publication No. Hei 10-293644).

However, the technologies disclosed in Japanese Patent Laid-Open Publications No. 2002-109558 and No. Hei 9-244866 both control rotation directions to provide operational sensations. Therefore, although rotational operability is possibly improved, no other operational feelings can be provided for operations such as horizontal and vertical movement and pointing to a position on a screen.

The technology disclosed in Japanese Patent Laid-Open Publication No. Hei 10-293644 has the effect of providing a click sensation accompanying a switching operation on the touch panel to improve the operability. However, it is extremely difficult to apply the technology to an interface in which an operating section is moved to perform switching and control operations.

SUMMARY OF THE INVENTION

The present invention has been made in order to solve these problems. The present invention advantageously provides a haptic interface device capable of preventing changes in operational feelings or sensations due to degradation of a member that produces a reaction force.

The present invention also advantageously provides a haptic interface device capable of providing operational sensations associated with various operations such as rotational, horizontal, and vertical movement and a pointing operation on a screen through a single operating member.

To achieve these advantages, a haptic interface device according to the present invention comprises operating means to be operated by an operator; driving means for providing a driving force to the operating means to provide a reaction force to the operator; detection means for detecting the state of operation performed on the operating means by the operator or the position of the operating means within the range of movement of the operating means and outputting the sate or position as a signal; and control means for controlling the driving means according to the signal output from the detection means and based on interface definition information defining specifications for the operating means to behave as an interface apparatus which the operating means are to mimic; wherein the haptic interface device provides the reaction force corresponding to the state of operation or position of the operating means that is detected by the detection means.

The haptic interface device may further comprise storage means for storing the interface definition information.

The control means may have operation determination means for identifying the state of operation by operator based on the signal output from the detection means.

According to one aspect of the present invention, the haptic interface device is characterized in that the storage means stores interface definition information in which a plurality of sets of specification information for said operating means to behave as one interface apparatus is defined; and the control means performs switching to a set of specification information corresponding to the state of operation identified by the operation determination section to control the driving means.

According to another aspect of the present invention, the haptic interface device is further characterized in that the operating means are moved in a substantially two-dimensional plane within the range of movement of the operating means.

According to another aspect of the present invention, the haptic interface device is further characterized in that the control means controls the driving means based on interface definition information so that the operating means are constrained onto a predetermined substantially straight line within a substantially two-dimensional plane.

According to another aspect of the present invention, the haptic interface device is further characterized in that the control means controls the driving means based on interface definition information so that the operating means are constrained onto a predetermined approximate circle in a substantially two-dimensional plane.

According to another aspect of the present invention, the haptic interface device is further characterized in that the storage means stores interface definition information about a plurality of interface apparatuses and the haptic interface device comprises interface selecting means for selecting an interface apparatus which the operating means is behaving, and the control means switch interface definition information used for controlling the driving means to interface definition information associated with the interface apparatus selected by the interface selecting means.

According to another aspect of the present invention, the interface selecting means are integrated with the operating means.

According to another aspect of the present invention, the detection means detect depression pressure applied to the operating means.

According to another aspect of the present invention, the haptic interface device is further characterized in that the control means performs switching to specification information corresponding to the depression pressure or the displacement of the pressure detected by the detection means, to thereby control the driving means.

According to another aspect of the present invention, the haptic interface device further comprises an external connection terminal through which a signal detected by the detection means is output to outside.

According to another aspect of the present invention, the control means selects a signal to be output through the external connection terminal according to determination made by the operation determination section.

According to another aspect of the present invention, the control means outputs a signal sent from the detection means to an image display device to cause the image display device to display an image of the interface apparatus that the operating means is behaving, the image display device being an external device.

According to another aspect of the present invention, the operating means are provided above the screen of the image display device.

According to another aspect of the present invention, the haptic interface device is further characterized in that the control means outputs a signal sent from the detection means to an audio output device to cause the audio output device to output a sound similar to that which would be generated by the interface apparatus that said operating means is behaving, in response to an operation by the operator, the audio output device being an external device.

According to the present invention, physical degradation of mechanisms due to a pressure applied to the operating means can be minimized because the reaction force provided to the operator is provided by electric circuitry and magnetic circuitry, instead of the mechanisms. Therefore, a durable, long-lived, reliable haptic interface device can be provided.

Furthermore, with the present invention, a single operating means can be configured to provide an operator with operational sensations corresponding to those of various interface apparatuses.

Moreover, an operational feeling appropriate to the operational state and position of the operating section can be provided by switching between different items of specification information used for controlling the driving means.

In addition, because detection signals can be output through the external connection terminal to an external device, an image displayed on the external device and audio output generated by the external device can be changed in response to a change of specification information or the operation status. Thus, a haptic interface device with high usability can be provided.

BRIEF DESCRIPTION OF THE DRAWINGS

FIGS. 23A to 23C are conceptual diagram showing the interface apparatus according to the eighth embodiment in single-sided/double-sided printing.

DESCRIPTION OF THE PREFERRED EMBODIMENTS

Preferred embodiments of the present invention will be described below with reference to the accompanying drawings.

First Embodiment

Figure 1:
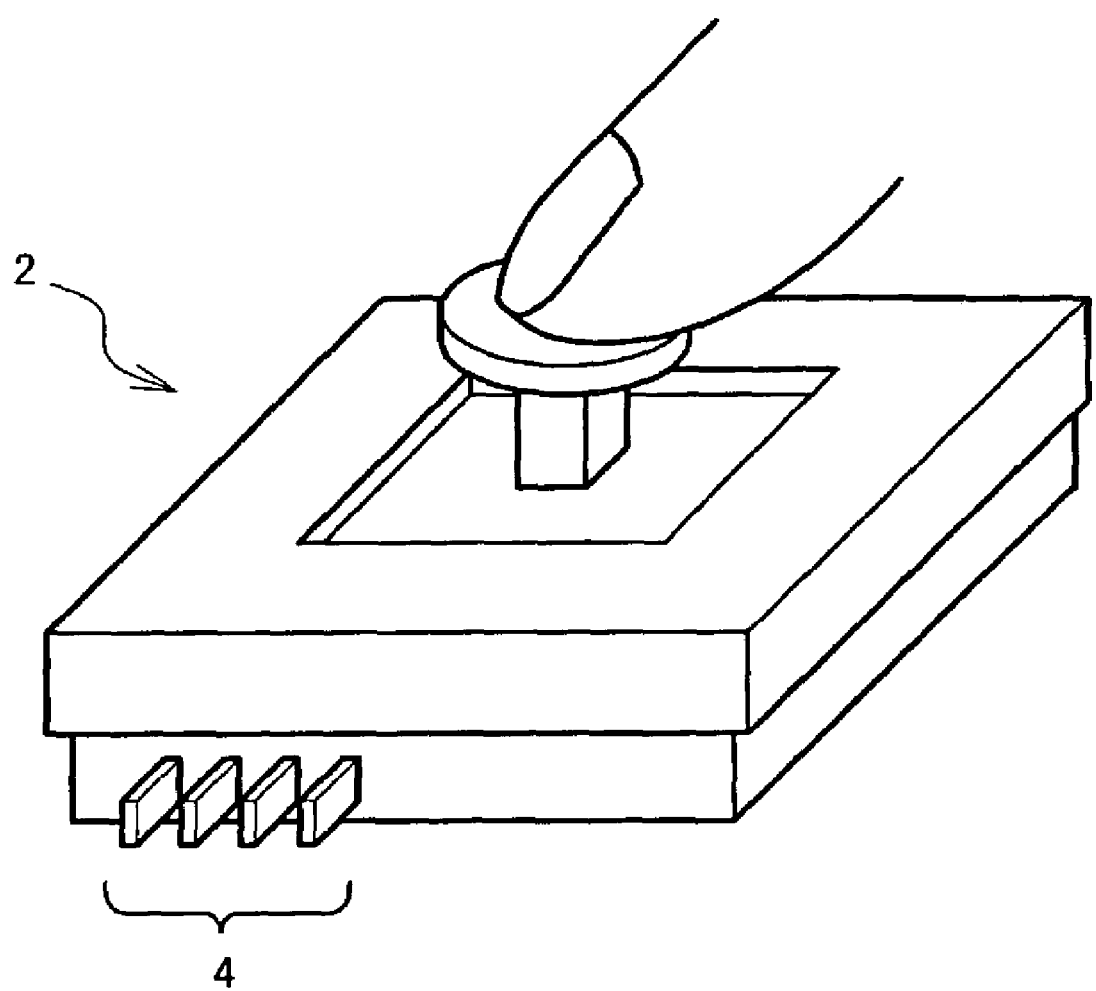
FIG. 1 is a schematic perspective view showing an embodiment of a haptic interface device according to the present invention.
Figure 2:
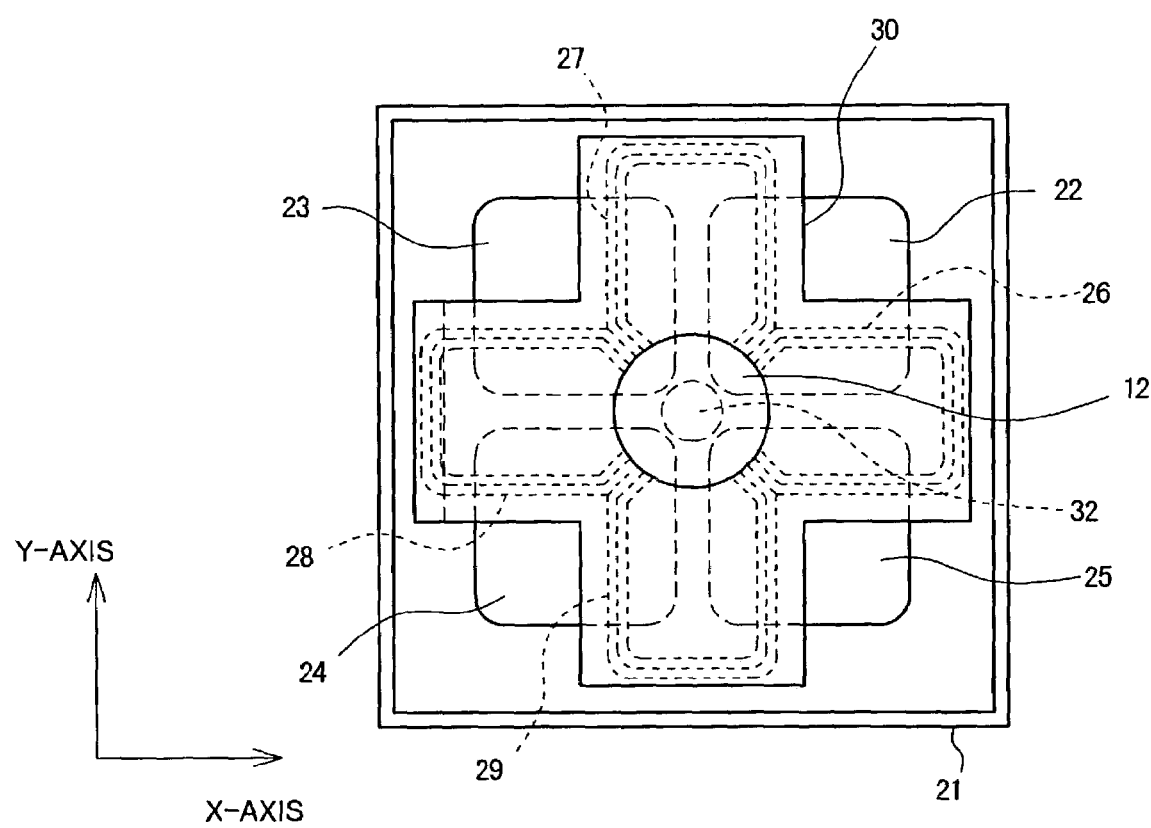
FIG. 2 is a plan view of the haptic interface device shown in FIG. 1, in which the top of its housing is cut away.
Figure 3:
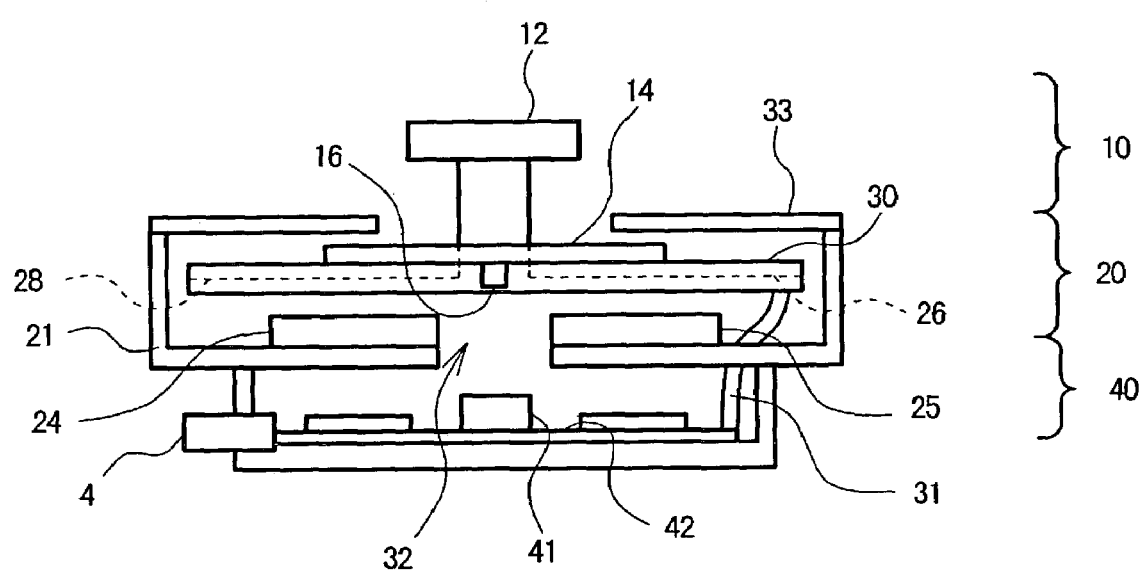
FIG. 3 is a side elevation view of the haptic interface device shown in FIG. 2.

FIG. 1 shows a schematic perspective view of one embodiment of a haptic interface device according to the present invention. FIG. 2 is a plan view of the haptic interface device shown in FIG. 1 in which the top of its housing is cut off. FIG. 3 shows a side elevation view of the haptic interface device shown in FIG. 2.

As can be seen from FIG. 1, the haptic interface device 2 of the present embodiment includes external connection terminals 4 consisting of terminals for exchanging signals with an external device and power supply terminals and has a construction allowing it to be embedded in the external device. The haptic interface device 2 can be roughly divided into a user interface section 10, a driving section 20, and a control section 40. The user interface section 10 has an operating section 12 to be operated by an operator. A light emitter 16 is mounted on the center of a base 14 supporting the operating section 12. To simplify the drawing, the light emitter 16 is omitted from FIG. 2.

The driving section 20 electromagnetically drives the operating member 12 to provide a reaction force to an operator operating the operating section 12. For that purpose, the driving section includes magnets 22, 23, 24, and 25 disposed in such a manner that their polarities are alternately oriented in a case 21 containing the driving section 20. The magnets 22–25 are polarized in their thickness direction of the device 2 so that a magnetic field is generated between adjacent magnets. Coils 26, 27, 28, and 29 and a frame 30 on which the coils 26–29 are mounted are provided over the magnets 21–25 in such a manner that the coils 26–29 are located between the magnets 21–25. An electric current is passed through the coils 26 and 28, which are provided in parallel along the x-axis in a magnetic field, in a predetermine direction according to Fleming's left-hand rule to drive the moving frame 30 along the y-axis. Likewise, an electric current is passed through the coils 27 and 29, which are provided in parallel along with the y-axis in a predetermined direction to drive the frame 30 along the x-axis. Accordingly, the frame 30 can be moved in a one-dimensional direction by passing a current through one of the pairs of coils, or moved in a two-dimensional direction expressed by the vector sum in the one-dimensional directions by passing through a current both of the pairs. In this way, the driving section 20 has a structure that allows the frame 30 to be moved in the case 21. A control section 40, which will be described later, causes a current to pass through the coils 26–29 via a signal line 31 to control the driving section 20 to move the frame 30 and the operating section 12 mounted on the frame 30 moves together with the movement of the frame 30. The driving section 20 electromagnetically provides a driving force to the operating member 12 under the control of the control section 40 in order to give a reaction force to the operator. The driving section 20 may be implemented by a two-dimensional actuator described in Japanese Patent Laid-Open Publication No. 2000-330688, for example.

An opening 32 is formed in the center of the case 21 so that a photosensor 41 can receive light emitted from the light emitter 16. The photosensor 41 detects the amount of movement of the operating section 12 based on the direction from which it detects the light. Therefore, the opening 32 should be sized so as not to inhibit light from traveling within the range of movement of the operating section 12. Alternatively, the photosensor 41 may detect the movement of the operating section 12 based on a position irradiated with light and the intensity of light in addition to the direction in which the light is detected.

The control section 40 comprises a control substrate 42 on which a control circuit acting as control means for controlling driving means is formed and the above-described photosensor 41 provided on the control substrate 42. The photosensor 41 senses light emitted from the light emitter 16 to detect the position of the operating member 12 within its moving range, as described above. Detection means according to the present embodiment includes the photosensor 41 and a detection circuit (not shown) provided on the control substrate 42 for detecting the status of an operation performed by the operator on the operating section 12. The range of movement of the operating section 12 is the same as the range within which the light can be detected by the photosensor 41. In effect, the range is determined by the size of the opening area in the surface 33 of the housing.

The status of operation performed by the operator on the operating section 12 refers to information required for knowing how the operator is operating the operating section 12 or what kind of operation the operator is going to perform on the operating section 12, such as an action for moving the operating section 12 up and down and/or left and right or an action for retaining the operating section 12 in the current position, and the strength of the operation (whether the operating section 12 is moved quickly or slowly). The detection circuit in the present embodiment detects the speed, acceleration, and the direction of the force exerted on the operating section 12 to detect the action (status of operation) performed by the operator. The external connection terminals 4 are connected to the control substrate 42 that output a signal detected by the detection means to an external device.

The haptic interface device 2 of the present embodiment is configured as described above and is typically installed within the housing of an external device such as an electric or electronic device or information processing device, and operated with external connection terminals 4 connected to the external device. Therefore, the housing of the haptic interface device 2 including the case 21 is preferably made of a magnetic shielding material such as silicon steel plate.

A surface 33 of the housing of the haptic interface device 2 may be in common with the surface of the housing or image display of the external device in which the interface apparatus 2 is contained.

The haptic interface device 2 in the present embodiment can provide operational feelings equivalent to those of various interface apparatuses such as a joystick, toggle switch, sliding lever, and (a click button of) a mouse, to the operator, as described later in detail. Control of the driving section 20 by the control section 40 determines the type of interface apparatus as which the haptic interface device 2 should behave, that is, the type of apparatus the haptic interface device 2 should mimic.

Figure 4:
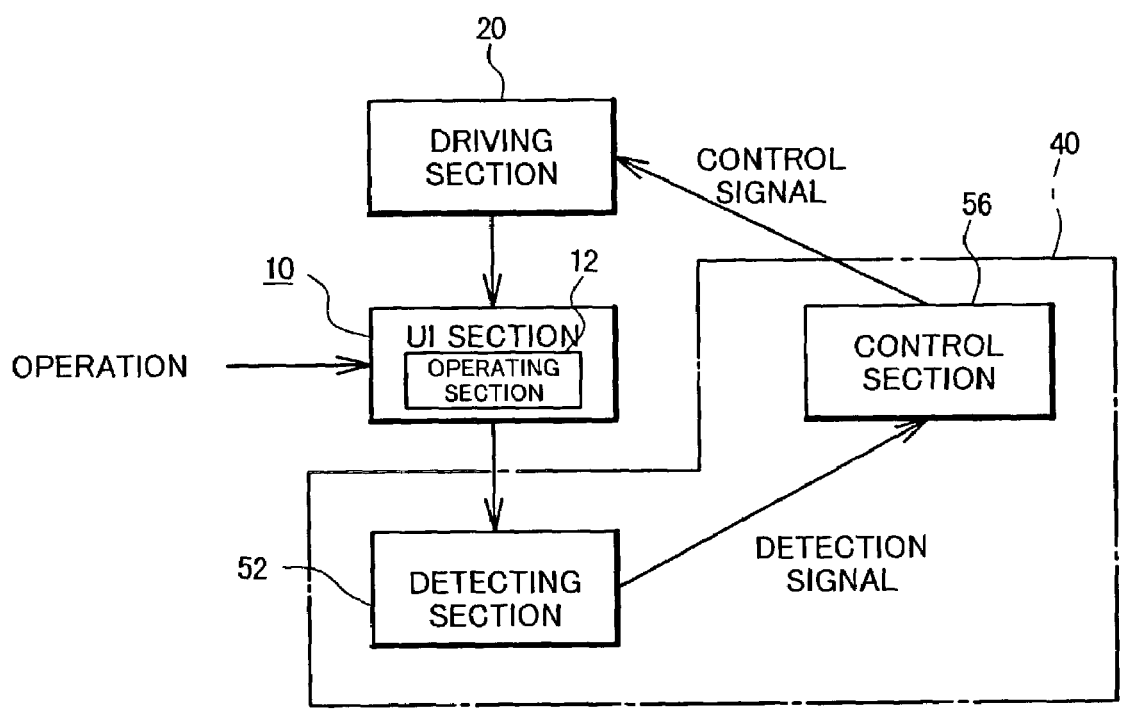
FIG. 4 is a functional block diagram of the haptic interface device according to the first embodiment.

FIG. 4 is a functional block diagram of the haptic interface device 2 in the present embodiment. Shown in FIG. 4 are the user interface (UI) operating section 10, driving section 20, and control section 40 corresponding to those in FIG. 3. The control section 40 includes a detection section 52 having functionality implemented by the photosensor 41 and the detection circuit described above and a control section 56 having functionality implemented by the control circuit. The detection section 52 detects the status of operation performed by the operator and the position of the operating section 50 and provides detection signals to the control section 56 to indicate the operation status and the position to it. The driving section 20 provides a driving force to the operating section 12 to provide a reaction force to the operator. The control section 56 controls the driving section 20 according to the signal output from the detection section 52.

As described above, the control section 20 provides reaction force to the operator through the operating section 12 under the control of the control section 56 to produce an operational feeling, which would be provided to the operator by the interface apparatus that the operating section 12 should behave. The control section 56 controls the driving section 20 based on preset interface definition information. The details of the interface definition information will be described later. A basic operation performed in the haptic interface device 2 when behaving as a joystick will be described first by way of example with reference to FIG. 5.

Figure 5A:
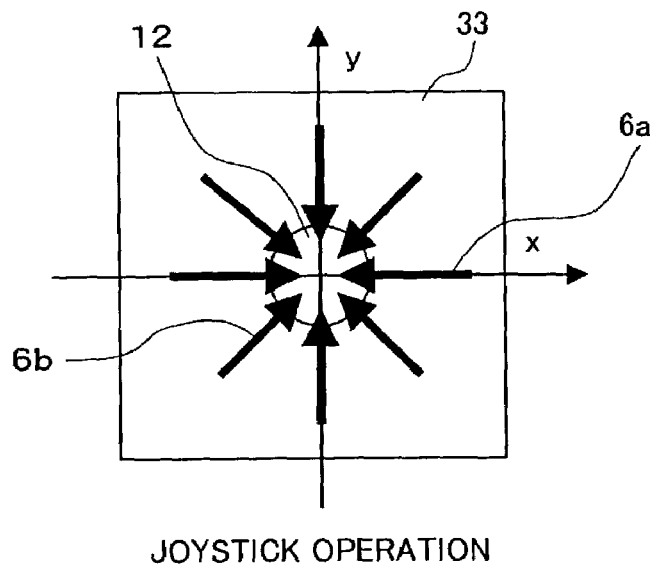
FIG. 5A shows reaction forces provided to an operating section when the haptic interface device according to the first embodiment is embodied as a joystick and FIG. 5B shows the relationship between the two-dimensional axes and driving forces when the haptic interface device is embodied as a joystick.
Figure 5B:
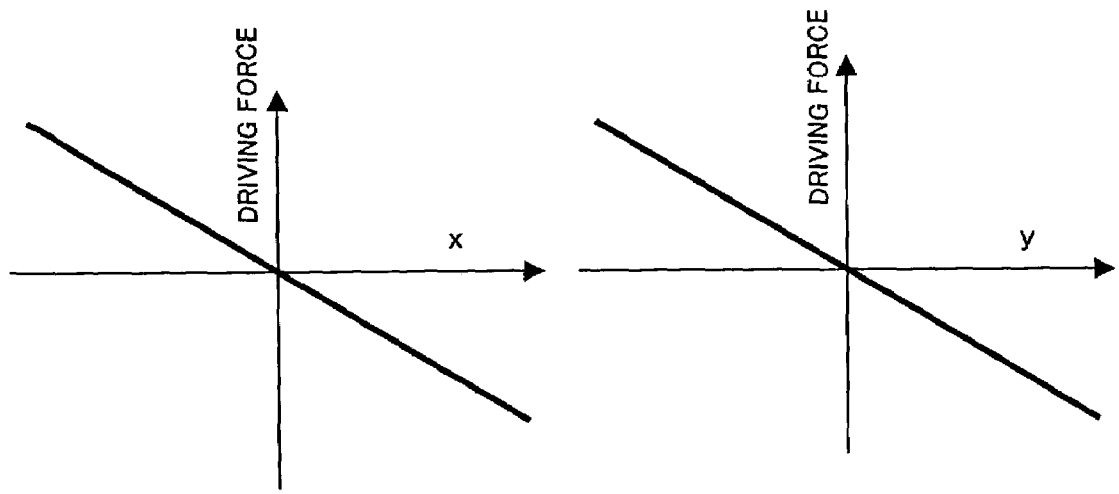

FIG. 5A is a plan view of the haptic interface device 2 when viewed from above as in FIG. 2, in which a surface 33 of the haptic interface device 2 and the top of the operating section 12 are shown. FIG. 5B shows the relationship between the position of the operating section 12 and a driving force provided by the driving section 20 to the operating section 12. Interface definition information controls the driving section 20 to deliver the driving forces shown in FIG. 5B to the driving section 20.

For example, when the operator moves the operating section 12 along the x-axis in its positive direction, in response to this operation, the detection section 52 detects the state of the operation and the position of the operating section 12 and outputs this information as detection signals to the control section 56. The control section 56 recognizes from the signals from the detection section 52 that the operating section 12 is moved along the x-axis in its positive direction and controls the driving section 20 based on predetermined interface definition information schematically shown in FIG. 5B. Referring to the graph of the x-axis in FIG. 5B, it can be seen that a driving force should be provided in the negative direction when the operating section 12 is moved in the positive direction of the x-axis. Therefore, the control section 56 outputs a control signal to the driving section 20 so as to drive it in that direction. Based on the control signal, the driving section 20 exerts a driving force on the operating section 12 in the negative direction along the x-axis, that is, in the direction along the x-axis indicated by arrow 6a. This provides to the operator a reaction force in the direction opposite to the direction in which the operating section 12 is moved. In the example shown in FIG. 5B, the driving force provided will increase with distance from the center of the operating section 12.

When the operator moves the operating section 12 in the negative direction of the x-axis and y-axis, the detection section 52 detects the status of operation and the position of the operating section 12 and outputs this information as detection signals to the control section 56. The control section 56 recognizes from the detection signals from the detection section 52 that the operating section 12 is moved in the negative direction between the x-axis and y-axis and controls the driving section 20 based on predetermined interface definition information schematically shown in FIG. 5B. Referring to the graph of x-axis in FIG. 5B, it can be seen that a driving force should be provided in the positive direction when the operating section 12 is moved in the negative direction of the x-axis. Also, referring to the graph of y-axis in FIG. 5B, it can be seen that a driving force is provided in the positive direction when the operating section 12 is moved in the negative direction of the y-axis. That is, the control section 56 outputs a control signal to the driving section 20 to indicate to it a driving force to exert each axis. Based on the control signal, the driving section 20 exerts the driving force on the operating section 12 in the positive direction of the x-axis and the y-axis, that is, in the direction indicated by arrow 6b. Consequently, a reactive force is provided to the operator in the direction opposite to the direction in which the operating section 12 is moved.

Thus, according to the present embodiment, the driving section 20 is controlled based on the interface definition information schematically shown in FIG. 5B to provide a driving force to the operating section 12 that has intensity according to the detection signal from the detection section 52 in the direction according to the detection signal provided from the detection section 52. Consequently, an operational sensation similar to that which would be provided by a joystick can be provided to the operator.

Interface definition information will be described below.

The control section 56 controls the driving section 20 based on the interface definition information according to an input detection signal. While definitions for operations in two-dimensional directions as illustrated in FIG. 5B are sufficient for the operating section (joystick) of a joystick apparatus which moves just in two dimensions, the intensity of the reactive force to be provided to the operator can be changed by changing the slope of the lines in the graph shown in FIG. 5B. For example, the intensity of the reactive force (sense of resistance) can be increased by steepening the slope of the line, thereby providing an operational feeling to the operator as if he or she were operating a joystick apparatus having a large resistance or centripetal force. Similarly, the reactive force can be reduced by flattening the slope, thereby providing an operational feeling of operating a joystick apparatus having a less resistance or centripetal force. In this way, specifications for the haptic interface device 2 to operate as an interface apparatus (joystick apparatus in this example), which can be schematically represented in FIG. 5B, may be defined as the interface definition information.

Driving forces of the driving section 20, that is, operations of the haptic interface device 2 can be defined by the interface definition information schematically represented in FIG. 5B, which will be detailed later. Because the operations of the haptic interface device 2 are defined by the shapes of the graph lines indicating the driving forces, the type of interface apparatus is not necessarily required to be specified in the interface definition information. Here, interface definition information is synonymous with specification information because only the interface definition information for the haptic interface device 2 to behave as the joystick apparatus shown in FIG. 5 is defined.

Figure 6:
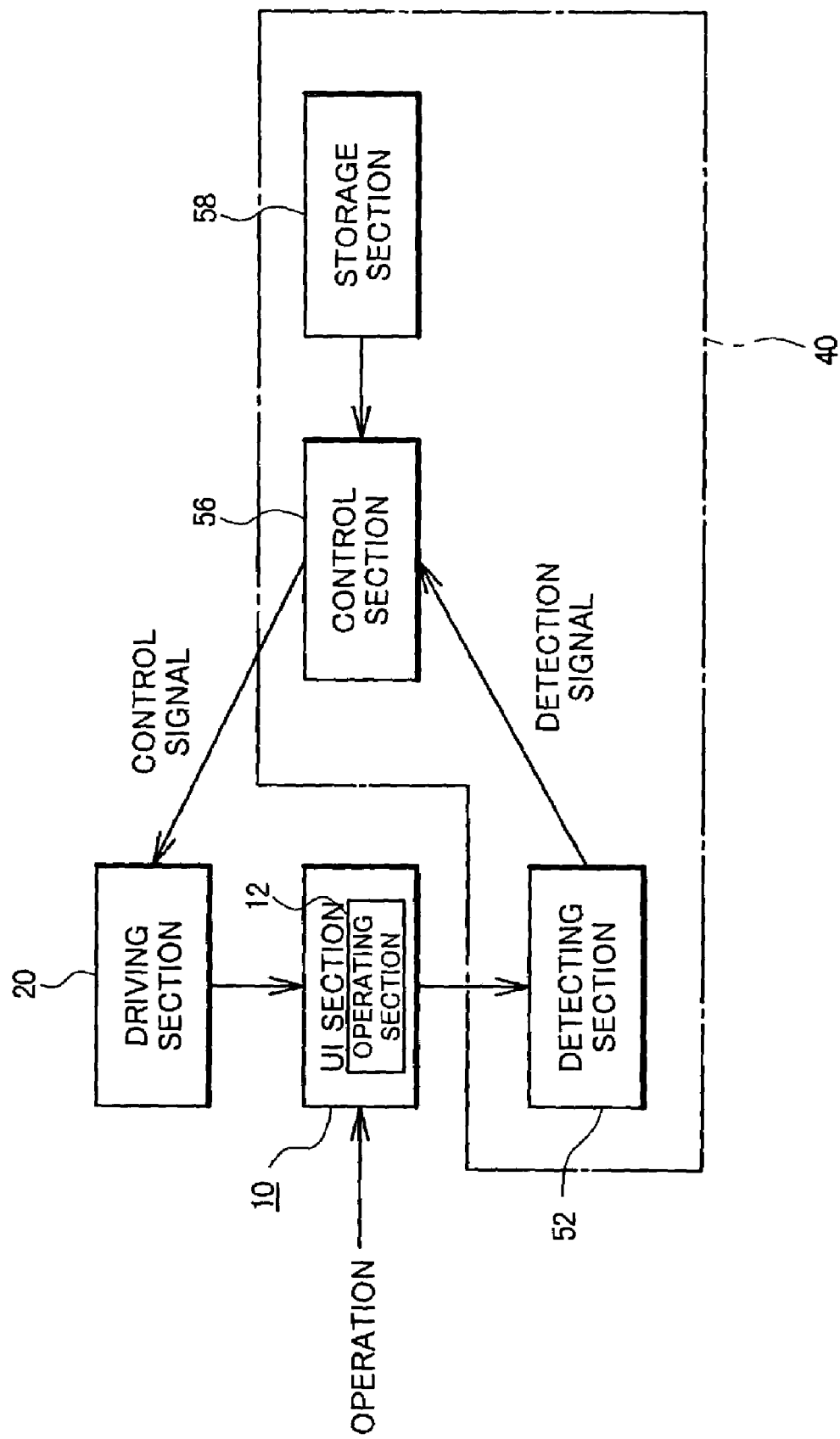
FIG. 6 is a functional block diagram of another haptic interface device according to the first embodiment.

A basic operation of the haptic interface device 2 has been described using an example in which the interface definition information is predetermined in the control section 56 and a unique reaction force based on FIG. 5B is provided. A storage 58 for storing the interface definition information can be further included as shown in FIG. 6, for example, and information stored in the storage 58 can be modified to implement a joystick that can provide a desired operational feeling.

An operation of the control section 56 will be further detailed below. The control section 56 determines an output F from the driving section 20 from a difference between the current position X of the operating section 12, which can be identified based on a detection signal from the detection section 52, and a target control position Xt under PID-control. The relational expression of these values is as follows:

$$F = Kp \times (X-Xt) + Kd/dt \times [(X-Xt)-(X0-Xt0)] + Ki \times \int (X-Xt)dt,$$

where X0 is the position one cycle before and Xt0 is the target value one cycle before. In a case of the haptic interface device 2, because an operation performed by the operator is included in disturbance, it is desirable that Ki of PID control is set to zero and used with PD control. Furthermore, control cycles ranging from at least several hundred to 1 KHz should be used in order to ensure the smoothness of the feeling of the operating section 12. Under this control, the restitution force (reaction force) of the operating section 12 with Kp will be as shown in FIG. 5B and the operating section 12 can be caused to behave as a joystick having the force of restitution to the target position (the center, in this embodiment) as shown in FIG. 5A. The slope of the graph line described above is determined by the value of factor Kp. Specification information schematically represented by the shape of the graph line is determined by a combination of an equation representing the graph line and values of the factors included in the equation.

While the present embodiment has been described using an example in which the above-provided equation including constant factors is stored in the storage 58 as specification information beforehand and modified when required, the factors may be input or specified from an external source and output F may be determined by the equation in which the specified factors are incorporated by the control section 56. In such a case, different operational sensations can be provided for the same operation on the operating section 12 by changing the values of factors while the single interface apparatus is being operated, because the equation including variable factors is used as specification information According to the present embodiment, the operational feeling provided to the operator is implemented by an electromagnetically operated two-dimensional actuator, instead of a material such as an elastic member while the interface, while the haptic interface device 2 is behaving as an input apparatus such as a joystick or a switch, degradation of the operational feeling provided by the interface apparatus can be prevented. Moreover, reaction forces in directions in a substantially two-dimensional plane can be provided, in addition to the rotational directions.

Second Embodiment

Figure 7:
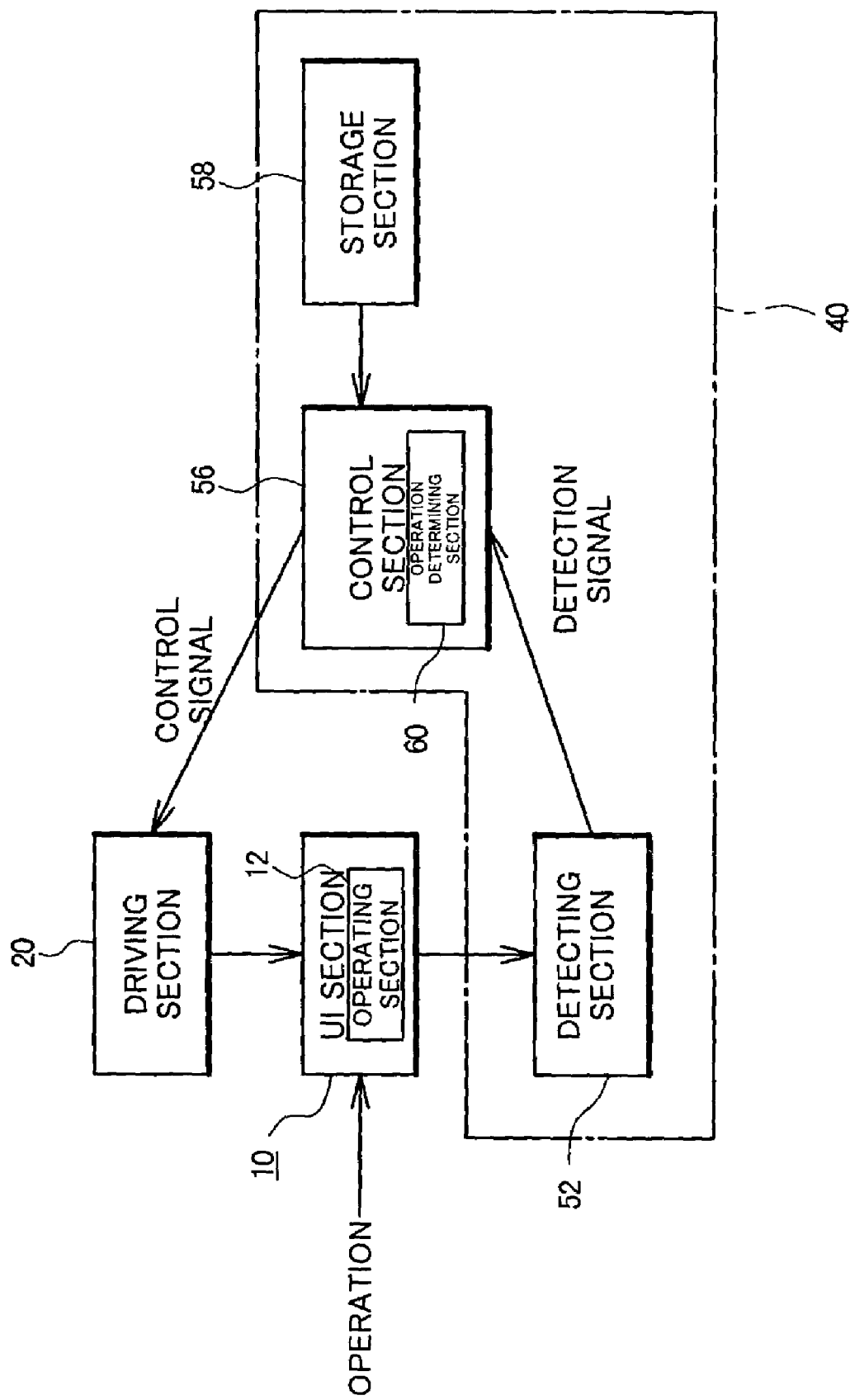
FIG. 7 is a functional block diagram of a haptic interface device according to a second embodiment.

FIG. 7 is a functional block diagram of a haptic interface device of a second embodiment. The same components as those in the first embodiment are labeled with the same reference numbers. The same applies to the description of third and subsequent embodiments. The second embodiment is characterized by an operation determination section 60 provided in a control section 56 in the configuration shown in FIG. 6 for determining the status of operation performed by an operator based on a signal output from a detection section 52. The present embodiment will be described with reference to FIG. 8 using an example wherein a haptic interface device 2 operates as a toggle switch.

Figure 8A:
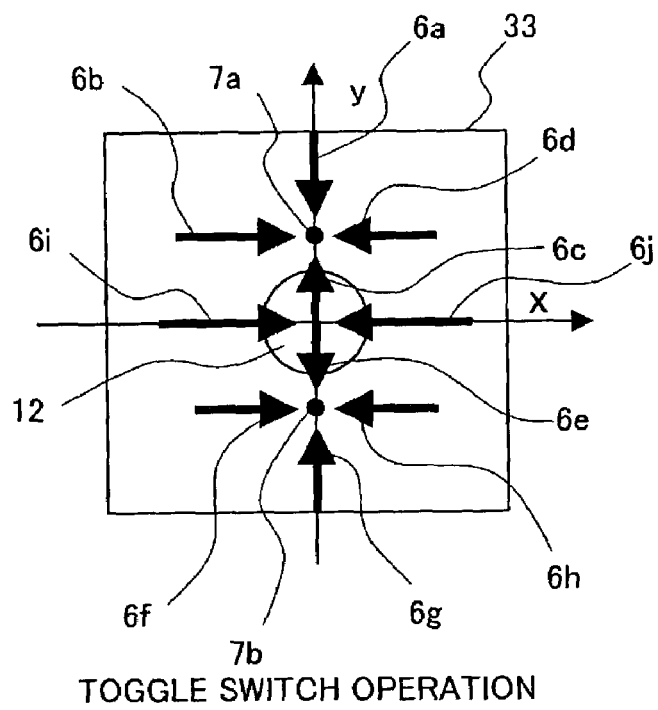
FIG. 8A shows reaction forces provided to an operating section when the haptic interface device according to the second embodiment is embodied as a toggle switch and FIG. 8B shows the relationship between the two-dimensional axes and driving forces when the haptic interface device is embodied as a toggle switch.
Figure 8B:
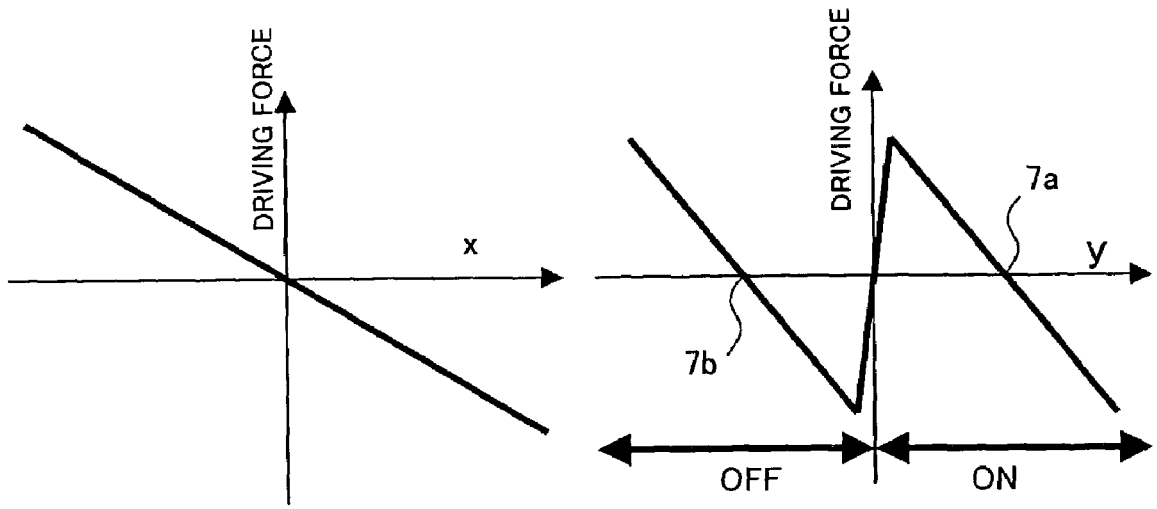

FIGS. 8A and 8B are drawings equivalent to FIGS. 5A and 5B of the first embodiment, respectively. The form of these drawings is essentially the same and therefore of the form will be omitted.

In FIG. 8A, the center at which reaction forces indicated by arrows 6a to 6d are directed is set to the ON state of a switch and the center at which reaction forces indicated by arrows 6e to 6h are targeted is set to the OFF state of the switch. The retention positions of an operating section 12 are indicated by points 7a and 7b in FIG. 8A. Because the reaction forces indicated by arrows 6b, 6i, and 6f and the reaction forces indicated by arrows 6d, 6j, and 6h are provided to the operating section 12, the operating section 12 is guided along the y-axis without drifting from it. The control section 56 controls the driving section 20 in this way based on the interface definition information to constrain the operating section 12 on a predetermined, substantially straight line in a substantially two-dimensional plane, thereby implement a toggle switch. The reaction forces will be further detailed below. The reaction forces indicated by arrows 6b, 6i, and 6f and the reaction forces indicated by arrows 6d, 6j, and 6h constrain the operating section 12 on the substantially straight line. Among the forces, the reaction forces indicated by arrows 6b, 6d, 6f, and 6h also retain the operating section 12 in retention positions 7a and 7b. The reaction forces indicated by arrows 6a, 6c, 6e, and 6g serve to retain the operating section 12 in each of retention positions 7a and 7b. The forces indicated by 6c and 6e also guide the operating section 12 to the adjacent retention position by a manual operation by the operator.

While only arrows 6b, 6i, 6f and arrows 6d, 6j, and 6h are shown in FIG. 8A for indicating reaction forces for constraining the operating section 12 on the substantially straight line, it can be seen from FIG. 8B that reaction forces are applied at all the positions on the straight line so as to move the operating section 12 along the y-axis.

When, for example, the operator moves the operating section 12 in the positive direction of the y-axis in order to turn the switch on, the detection section 52 detects the status of operation and position of the operating section 12 and outputs detection signals to the control section 56. The control section 56 controls the operating section 12 to be restrained at point 7a when it determines from the detection signal from the detection section 52 that the operating section 12 is in the positive area of the y-axis. It can be seen from the y-axis graph in FIG. 8B that an extremely strong driving force is applied near the center of the operating section 12 in the positive direction of the y-axis. That is, when the operating section 12 is moved by the operator in the positive direction of the y-axis from the neutral center position, the control section 56 actively guides the operating section 12 further in the positive direction. This can smoothen the movement of the operating section 12. When it moves a certain distance, the driving force decreases and the line indicating the driving force in the graph eventually intersects with the y-axis. The intersection point 7a corresponds to the retention point 7a in FIG. 8A. In other words, when the driving force is zero at retention point 7a, no reaction force is applied along the y-axis. Thus, the operating section 12 is retained at point 7a unless an external force (usually an operational force applied by the operator) is applied. Consequently, the switch is retained in the ON state. On the other hand, when the switch is moved from the neutral center position to the OFF position, an operation counter to the above-described operation is performed and therefore the description of which will be omitted.

Figure 9A:
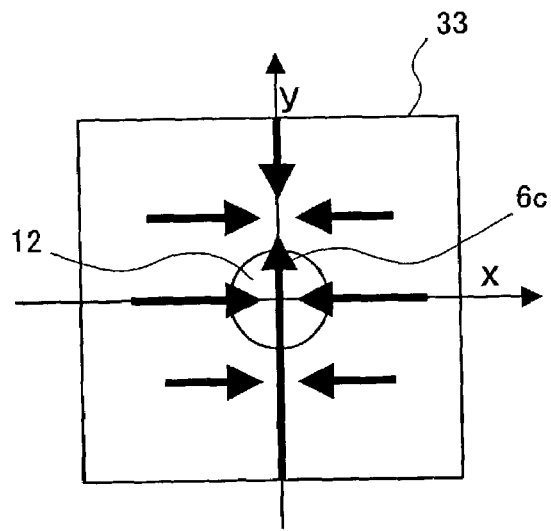
FIG. 9A shows reaction forces provided to the operating section of the haptic interface device according to the second embodiment when the operating section is in the ON position and FIG. 9B shows the relationship between the two-dimensional axes and driving forces when the operating section is in the ON state.
Figure 9B:
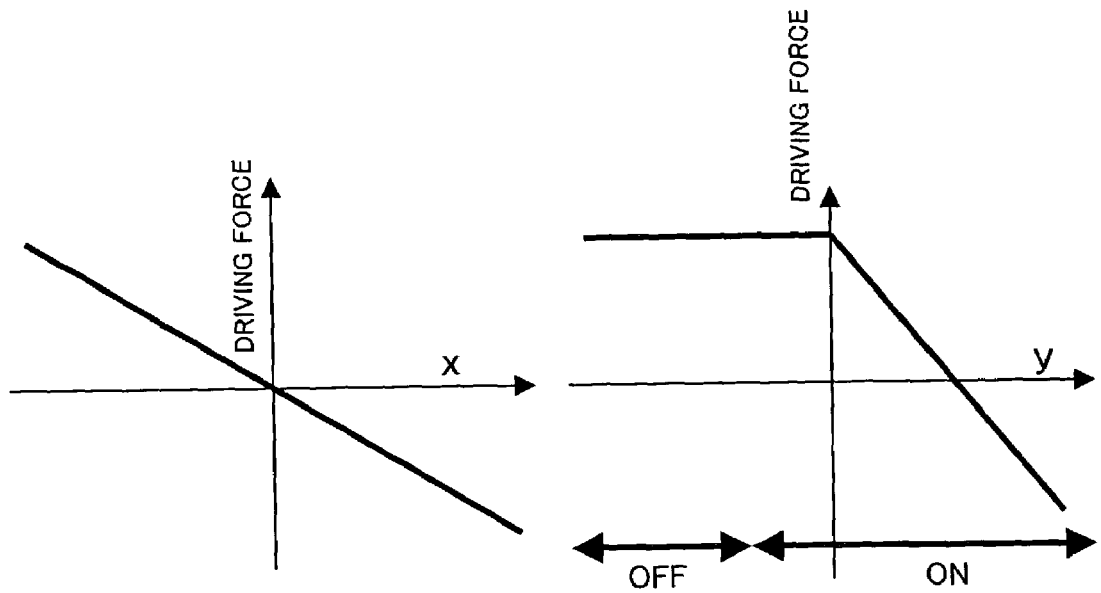
Figure 10A:
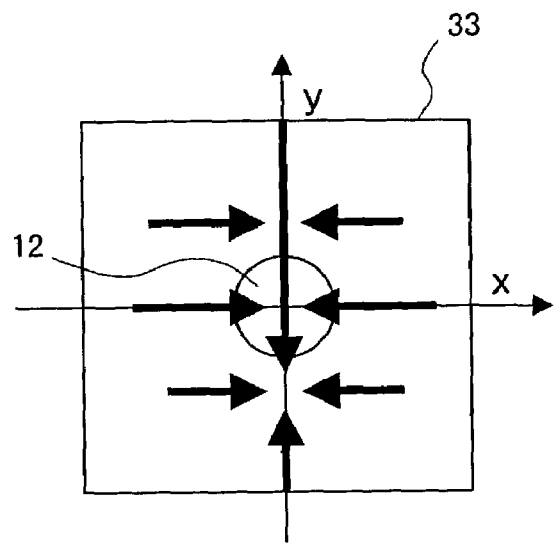
FIG. 10A shows reaction forces provided to the operating section of the haptic interface device according to the second embodiment when the operating section is in the OFF state and FIG. 10B shows the relationship between the two-dimensional axes and driving forces when the operating section is in the OFF state.
Figure 10B:
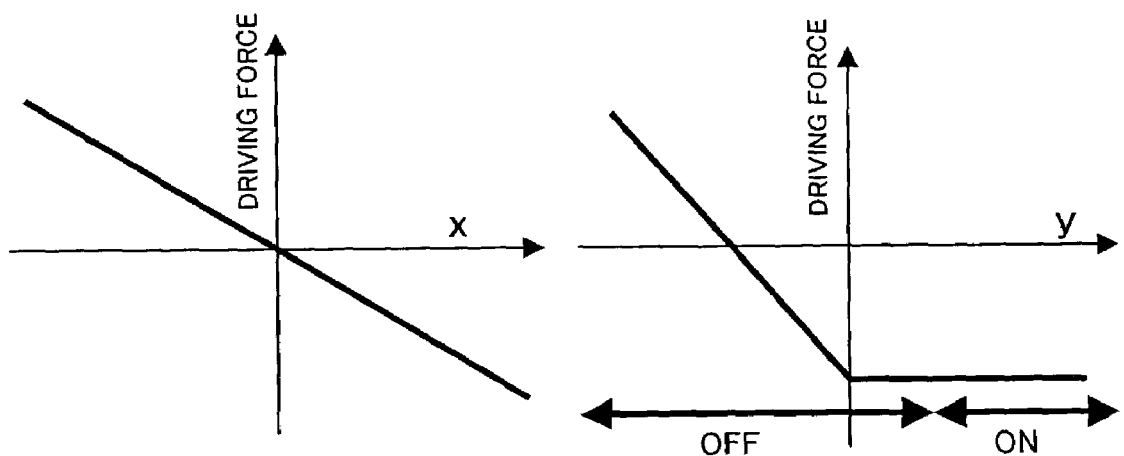

In order to ensure that the switch is properly functioning without malfunction and jittering, interface definition information on each of the ON and OFF states may be provided to implement hysteresis operations. FIGS. 9A, 9B, 10A, and 10B are diagrams equivalent to FIGS. 8A and 8B. FIGS. 9A and 9B show the switch ON state of the operating section 12 and FIGS. 10A and 10B show the switch OFF state of the operating section 12. In the present embodiment, instead of the interface definition information shown in FIG. 8 two sets of interface definition information shown in FIGS. 9 and 10 are stored in the storage 58 and either of them is used depending on a change in state. That is, more than one set of specification information is defined in the sets of interface definition information for causing the haptic interface device 2 to behave as a toggle switch. As described earlier, an operation determination section 60 is provided in the present embodiment. When the operation determination section 60 determines based on a detection signal from the detection section 52, which in this case is a detection signal indicating the position of the operating section 12 detected by the photosensor 41, that the operating section 12 is in the neutral position, the control section 56 controls the toggle switch to move in the positive direction based on the specification information in FIG. 9 if specification information referenced indicates ON, or controls the toggle switch to move in the negative direction based on the specification information in FIG. 10 if the specification information reference indicates OFF. Thus, the control section 56 controls the same toggle switch in different ways.

According to the present embodiment, a plurality of sets of specification information are provided for the same interface apparatus so that switching between them can be performed according to the operation state or location of the operating section 12 (or the position of the operating section 12 in this embodiment). Therefore, the haptic interface device can provide an operational feeling analogous to that of an interface apparatus to an operator.

Third Embodiment

The second embodiment has been described with respect to an example wherein the haptic interface device behaves as a toggle switch that is retained in two positions, ON and OFF. The number of retention positions, or retention points, on the straight line can be increased to implement a sliding switch, which is a multilevel-selector switch. The functional block configuration of this embodiment is the same as those shown in FIG. 6 or 7.

Figure 11:
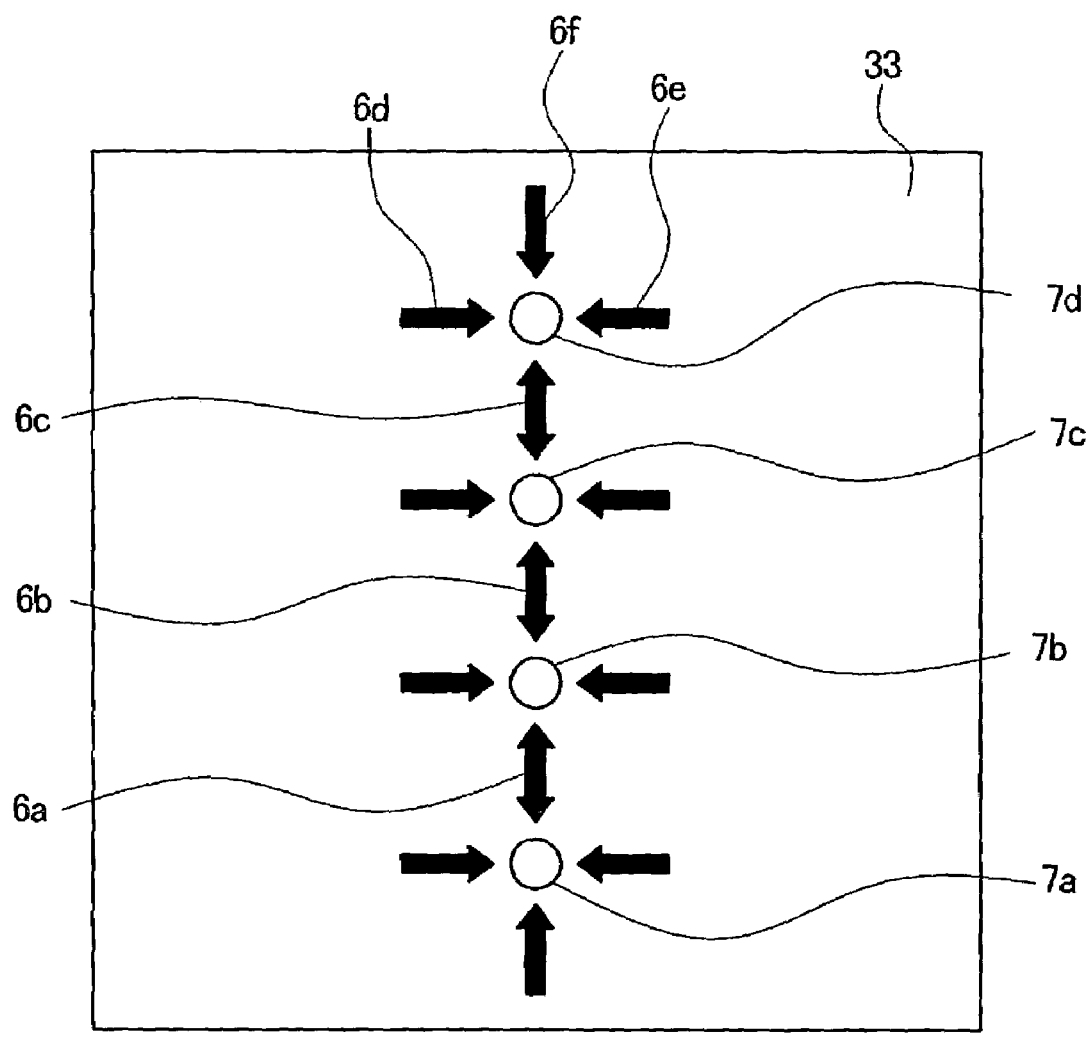
FIG. 11 shows reaction forces provided to an operating section and its retention positions when a haptic interface device according to a third embodiment is embodied as a sliding switch.

FIG. 11 shows the retention points 7a–7d of the operating section of a haptic interface device when operating as a sliding switch according to the third embodiment. Reaction forces applied to the operating section within its moving range are represented by adding to retention points on the substantially straight line shown in FIGS. 8A, 9A and 10A, as indicated by arrows 6a–6c. The operating section is omitted from FIG. 11.

The sliding switch shown in FIG. 11 retains its operating section 12 at four points. The sliding points 7a–7d correspond to "Off", "Low", "Medium", and "High" positions, respectively, of an air volume switch, for example. Reaction forces are applied when the operating section 12 moves from a retention point to another. An operation like that of a slide volume can be implemented by further increasing the number of retention points to allow the operating section 12 to move in a substantially continuous manner, or by inhibiting driving forces from being produced in the y-axis direction.

A consideration, which is not involved in the joystick, is involved in the sliding switch illustrated in the present embodiment that has an even number of retention points and also in the toggle switch described earlier. If no retention point is provided in the center of the moving range of the operating section 12, it is practical to control the operating section 12 to be positioned at one of the retention points predetermined as its initial position. Therefore, based on interface definition information, a control section 56 controls a driving section 20 to move the operating section 12 from the current position, which the control section 56 can identify from a signal sent form a detection section, to the predetermined initial position and retain it there when the interface apparatus starts to operate as the slide switch. For the toggle switch or the sliding switch described earlier, it may be preferable that the initial position is the "OFF" position. The initial state is not limited to this, of course. For example, the end state of the operating section 12 at the time interface apparatus ends its behave as the toggle switch may be stored and that state may be used as the initial state the next time it behaves as the toggle switch.

Fourth Embodiment

The third embodiment has been described with respect to a sliding switch as an example of a multilevel-selector switch. In a fourth embodiment, a jog dial is provided as another example. The functional configuration block of the fourth embodiment is the same as that shown in FIG. 7.

Figure 12:
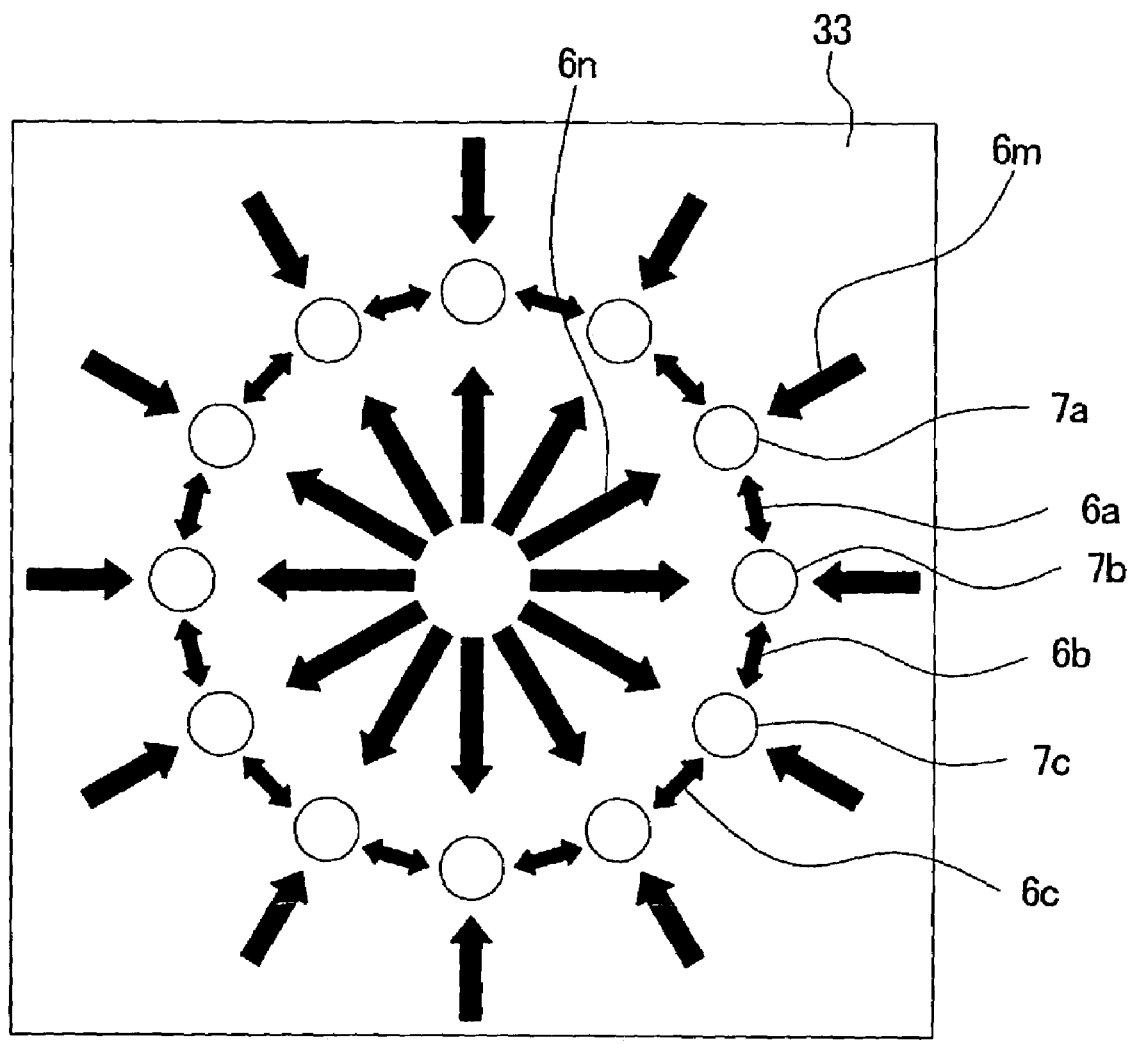
FIG. 12 shows reaction forces provided to an operating section and its retention positions when a haptic interface device according to a fourth embodiment is embodied as a jog dial.

FIG. 12 shows retention points 7a, 7b, 7c, . . . of the operating section of a haptic interface device behaving as a jog dial according to the fourth embodiment. Reaction forces applied to its operating section within its moving range can be represented by arranging the arrangement shown in FIGS. 8A, 9A, and 10A is on a substantially circular form as indicated by arrows 6a, 6b, 6c, . . . . The operating section is omitted from FIG. 12.

A control section 56 in the fourth embodiment is characterized in that it controls a driving section 20 to constrain the movement of the operating section 12 on a predetermined approximate circle in a substantially two-dimensional plane. Reaction forces 6m and 6n indicated in association with retention point 7a are reaction forces for constraining the operating section to the circle. The jog dial of the present embodiment can be formed by forming the sliding switch illustrated in the third embodiment in a circular form. The jog dial is, however, different from the switch of the third embodiment in that it has no endpoint. The basic operations of the job dial are the same as those in the third embodiment and therefore the detailed description will not be repeated.

Jog dials are used as single-frame advance play dials of video recorders or rotary volumes of audio devices. According to the present embodiment, the haptic interface device is capable of behaving as a jog dial.

The present embodiment has been described with respect to the example in which a circle is divided into twelve and twelve retention points are provided. The number of retention points is not limited to twelve. For example, a larger number of retention points results in an operating section that moves smoothly and can provide to an operator an operational touch without a retaining feeling at each retention. On the other hand, a smaller number of retention points results in a jog dial that provides a rugged touch to the operator. If the number of retention points is reduced to four, the apparatus can be caused to behave as a rotary switch for air volume control that has a function similar to a sliding switch.

Fifth Embodiment

Figure 13:
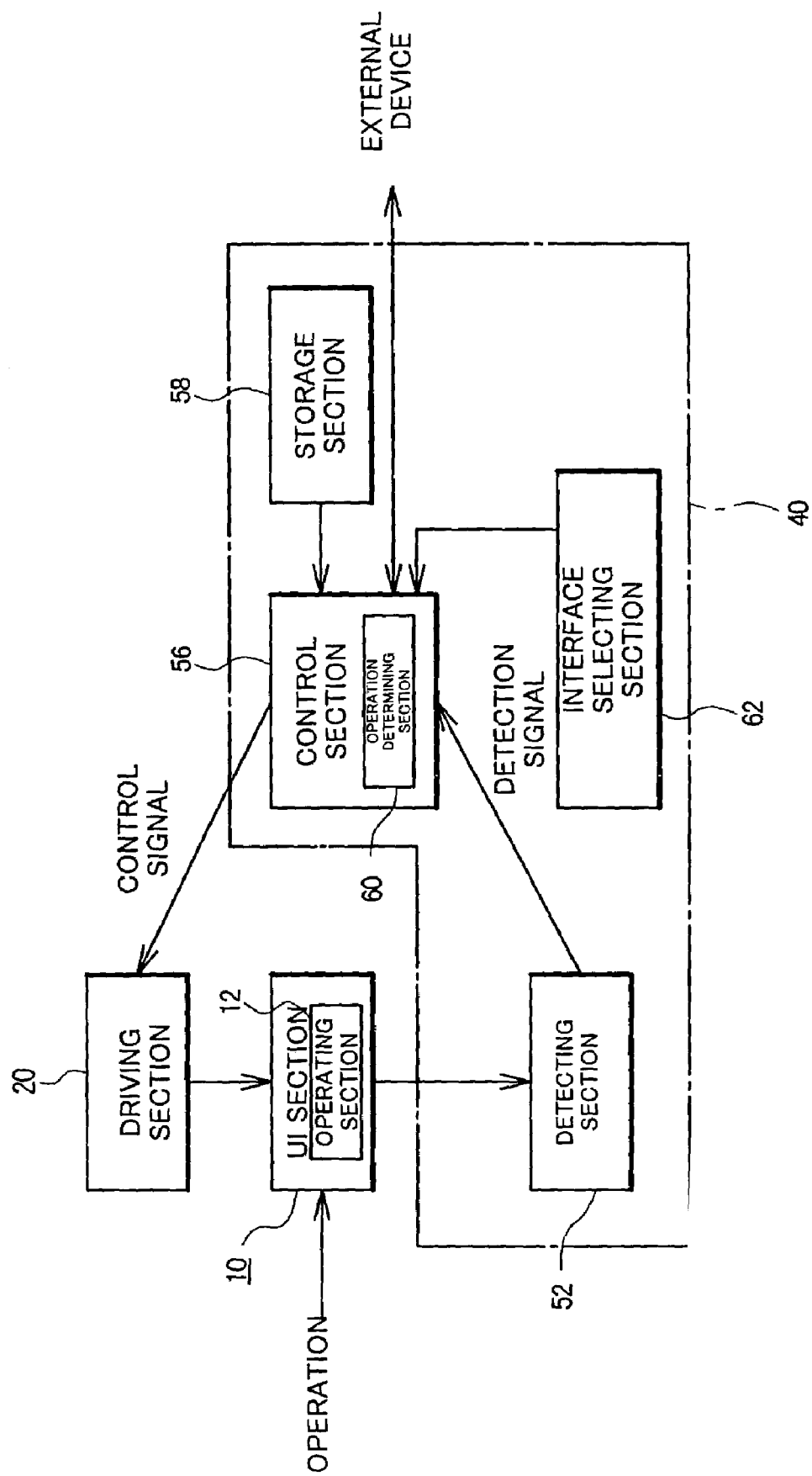
FIG. 13 is a functional block diagram of a haptic interface device according to a fifth embodiment.

FIG. 13 is a functional block diagram of a haptic interface device according to a fifth embodiment. The haptic interface device in the present embodiment has a configuration described with respect to the second embodiment (shown in FIG. 7) to which an interface selecting section 62 is added. A control section 56 sends and receives signals to and from an external device.

In the examples described with respect to the foregoing embodiments, a haptic interface device according to the present invention is applied to an interface apparatus such as a joystick, toggle, and switch. The fifth embodiment is characterized in that a haptic interface device can behave as a plurality of interface apparatuses. For that purpose, interface definition information on the plurality of interface apparatuses is stored in a storage 58 and the control section 56 selects interface definition information corresponding to an interface apparatus selected by a user in the present embodiment. The interface selecting section 62 is a means for selecting an interface apparatus that an operating section 12 behaves.

Figure 14:
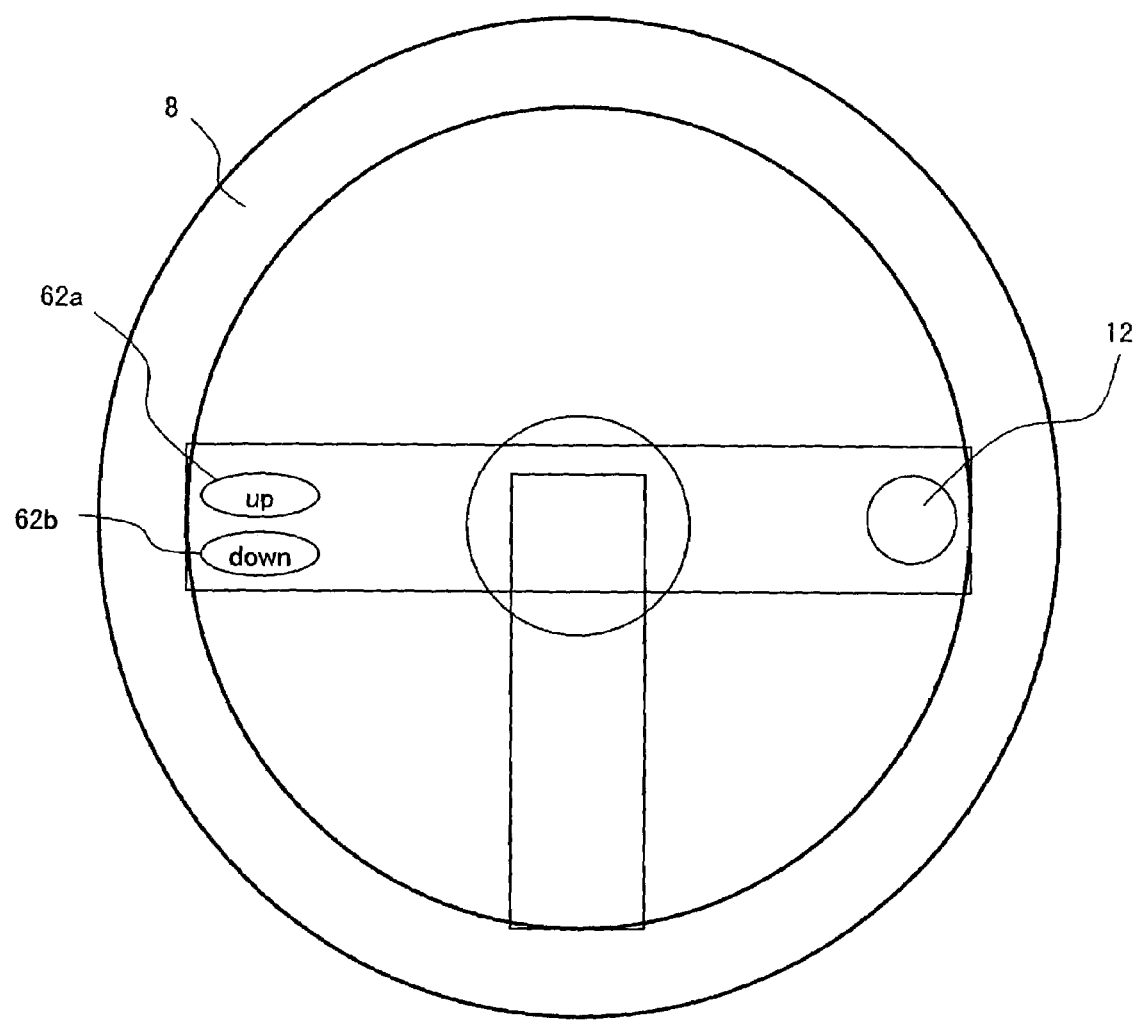
FIG. 14 is a schematic diagram of a haptic interface device according to the fifth embodiment installed in the steering wheel of an automobile.

An example in which the haptic interface device according to the present embodiment is applied to an automobile. FIG. 14 shows a schematic diagram of an automobile steering wheel to which a haptic interface device according to the present embodiment is attached. Shown in FIG. 14 are the operating section 12 of the haptic interface device attached to the steering wheel 8 and Up and down buttons 62a and 62b, which are equivalent to the interface selecting section 62.

Figure 15:
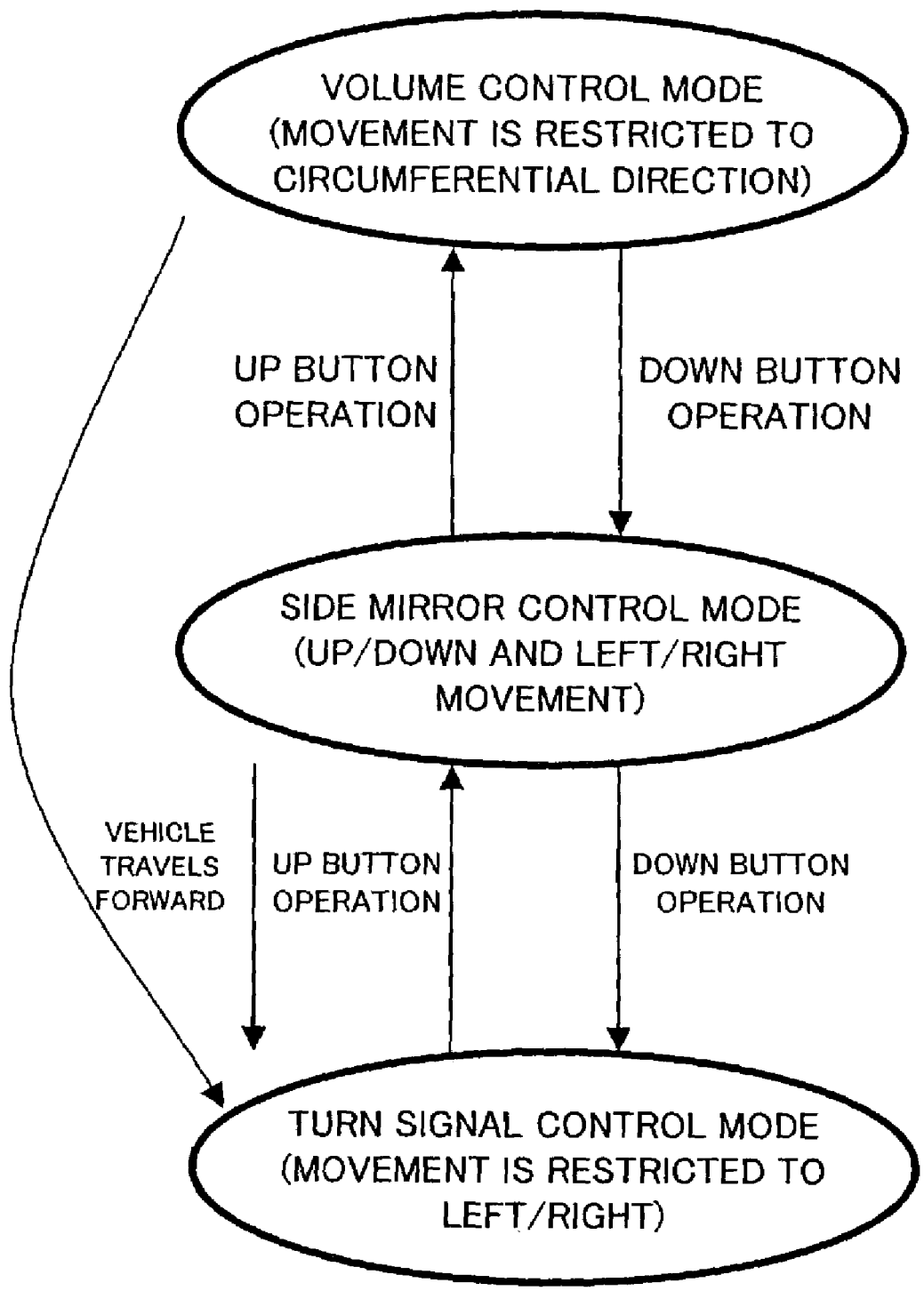
FIG. 15 shows transitions of the operation mode of the haptic interface device according to the fifth embodiment.

FIG. 15 is a conceptual diagram showing transition of modes in the interface apparatus switched according to the present invention. As can be seen from FIG. 15, the haptic interface device is used for controlling volume, controlling the angle of side mirrors, and directing turn signals. A jog dial is suitable for volume control, a joystick that can move up and down and left and right is suitable for side mirror control, and a sliding switch is suitable for turn signal control. Interface definition information for causing the haptic interface device to operate as each of these interface apparatuses is stored in the storage section 58.

Operations according to the present embodiment will be described below.

When a switch in the automobile is turned on, the haptic interface device begins operation by receiving a signal from an external device, which is an on-vehicle controller. The haptic interface device may be in any mode at the startup. For example, the device may be in a preset mode, or the state of the interface apparatus when the switch of the vehicle is turned off may be stored and used as the initial mode the next time the switch is turned on. If an operator wishes to adjust a side mirror, he or she operates the up or down button 62a, 62b, as appropriate, to place the interface apparatus in side mirror control mode. The current mode may be displayed on a display in the vehicle by the control section 56 outputting a select mode signal to the on-vehicle controller.

The haptic interface device behaves as a joystick in side mirror control mode. In this mode, the operator can move the operating section up and down and left and right to adjust the angle of a side mirror. A toggle switch that moves sideways is suitable for selecting one of the left and right side mirrors. Switching between the joystick and toggle switch may be accomplished by a logic that incorporates a side mirror selection mode in FIG. 15.

When the volume control mode is selected by operating the up/down buttons 62a, 62b, the control section 56 responds to the selection braking a switch from interface definition information about joystick to interface definition information about jog dial and starts controlling a driving section 20. Thus, the haptic interface device can behave as the jog dial when the volume control mode is selected. When the turn signal control mode is selected by operating the up/down buttons 62a, 62b, the control section 56 in response to the operation makes a switch from the interface definition information about jog dial to interface definition information about sliding switch and starts controlling the driving section 20. Thus, the haptic interface device can behave as the sliding switch when the turn signal control mode is selected.

Preferably, the sliding switch used in turn signal control mode has retention points in its center, and on the left and right and can behave as a three-level sliding switch capable of moving sideways only. Therefore, specification information for causing the operating section to move in this way is defined in the interface definition information.

In the present embodiment, a plurality of interface apparatus can be implemented by the single operating section as described above. Accordingly, interface apparatus installation space can be conserved. As illustrated above, the present invention is especially effective when installed in a vehicle including multiple functions. In order to adapt the haptic interface device to vehicle driving, some arrangement for mode switching is required. For example, because turn signals are required in most vehicles, the haptic interface device may be automatically placed in the turn signal control mode when forward movement of the vehicle is detected or after the volume control or side mirror control has not been performed for a certain period of time, as shown in FIG. 15. In today's automobiles, when, after a turn signal is activated, the steering wheel is turned in that direction and returned to the original position, the turn signal is turned off in response to the movement of the steering wheel. Similar control should be implemented by the haptic interface device. To address this, the following measures may be taken.

Specification information about the sliding switch for turn signals specifies three retention points arranged side by side as the initial state as described above. That is, specification information is defined and used so that the operating section moves in that way. A signal indicating the steering angle or rotation angle of the steering wheel sent from the on-vehicle controller or a steering angle sensor is continuously provided to the control section 56. When the steering wheel is turned in one direction and then in the opposite direction for some distance toward the previous position, the control section 56 switches to a set of specification information that does not specify the retention point at which the operating section is retained. Switching from one set of specification information to another has been described with respect to the second embodiment. Alternatively, switching to interface definition information about the joystick, rather than the specification information, may be performed to achieve the same effect. When the steering wheel operation is completed, specification information on the three-level sliding switch having three retention points arranged sideways is switched to. Thus, the operating section can be returned to the neutral, center position by switching from the specification information specifying the retention point at which the operating section is retained to the specification information that does not specify the retention point.

The above embodiment has been described with respect to an example haptic interface device in which only one set of interface definition information is stored in the storage section 58, one or more sets of specification information is defined, and switching from one set of specification information to another is performed as appropriate according to the position of the operating section. This allows the same operation on the sliding switch, for example, to provide different operational feeling to an operator by switching between the sets of specification information depending on the position or moving direction of the operating section.

This embodiment has been described with respect to an example haptic interface device in which a plurality of sets of interface definition information are stored in the storage section 58, one or more sets of specification information are defined in it, and switching from one set of specification information or interface definition information to another as appropriate according to the position of the operating section or a signal sent from the external device. Thus, the single haptic interface device can provide operations of different types of interface apparatuses. In addition, the same type of interface apparatus can provide different types of sliding switches such as three-level or four-level sliding switches. The same type of interface apparatus that provides different functions is treated as different interface apparatuses and separate sets of interface definition information is provided for them.

As is clear from the forgoing description, information defined as specification information (the shape of lines represented in a graph such FIG. 8B) determines the type of interface apparatus the haptic interface device of the present invention should behave. In other words, any desired interface apparatus can be formed by defining appropriate specification information. For example, a new interface apparatus can be provided, such as a T-shape or L-shape sliding switch that is a combination of a sliding switch moving up and down and another sliding switch moving left and right, or a sliding switch whose tip is a joystick. In this manner, a plurality of interface apparatus can be implemented by a single operating section and, in addition, a virtual, novel interface apparatus can be provided according to the present embodiment.

In the first embodiment, only one set of interface definition information is generated in which only one piece of specification information is defined and therefore no information for identifying the information is required. In the second embodiment, only one set of interface definition information is generated and a plurality of sets of specification information in the interface definition information is defined. Therefore, information for identifying the sets of specification information is required but no information identifying the interface definition information is required. In the fifth embodiment, a plurality of sets of interface definition information are generated. Therefore, information for identifying each of the sets of interface definition information is required so that individual sets of interface definition information can be identified when mode switching is performed.

Furthermore, while the up and down buttons 62*a* and 62*b* are provided separately as selection switches in a position away from the operating section in the present embodiment, the selection switch function may be incorporated into the operating section. For example, a pressure sensor may be attached to the tip of the operating section. When the pressure sensor detects a depression exceeding a predetermined pressure, the control section 56 considers it as a mode switching operation performed by an operator and performs mode switching. Because the transition in this case is made only in one direction, the mode transition is cyclic.

The haptic interface devices in the earlier embodiments can be implemented by two-dimensional linear motors. In the present embodiment, by contrast, it is necessary to detect operations in three-dimensional directions. For that purpose, detection means such as a pressure sensor is required. However, this can reduce the number of switches required to be attached to the external device. Moreover, the pressure sensor can be caused to behave as a touch sensor by adapting it so as to be capable of detecting depression.

Sixth Embodiment

The fifth embodiment has been described with respect to an example in which the haptic interface device is applied to the automobile steering wheel. A sixth embodiment will be described with respect to an information processing unit, which is an external device.

Figure 16A:
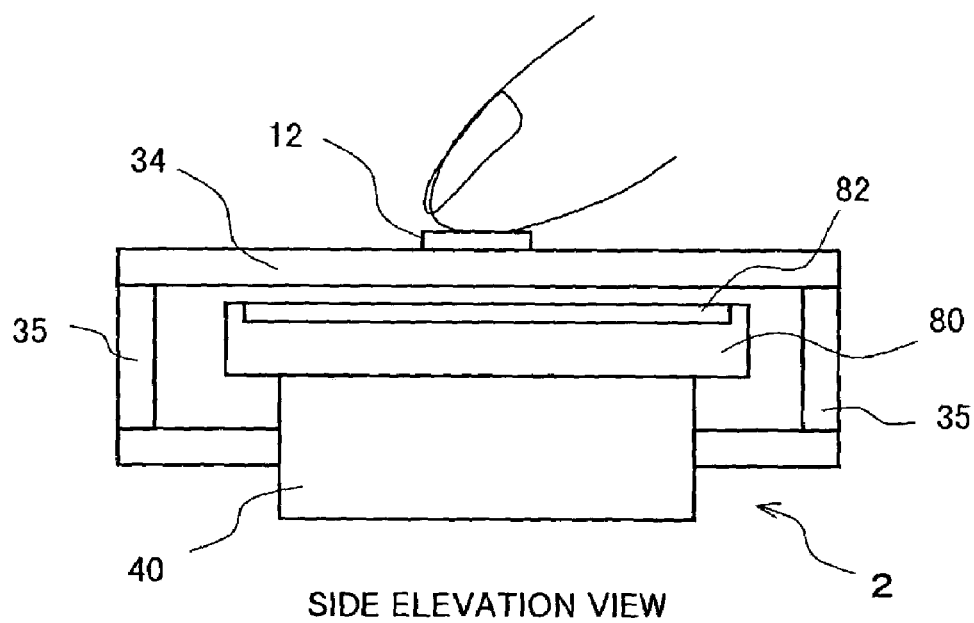
FIG. 16A is a schematic side elevation view of a haptic interface device according to a sixth embodiment and FIG. 16B is a plan view of an information processing unit.
Figure 16B:
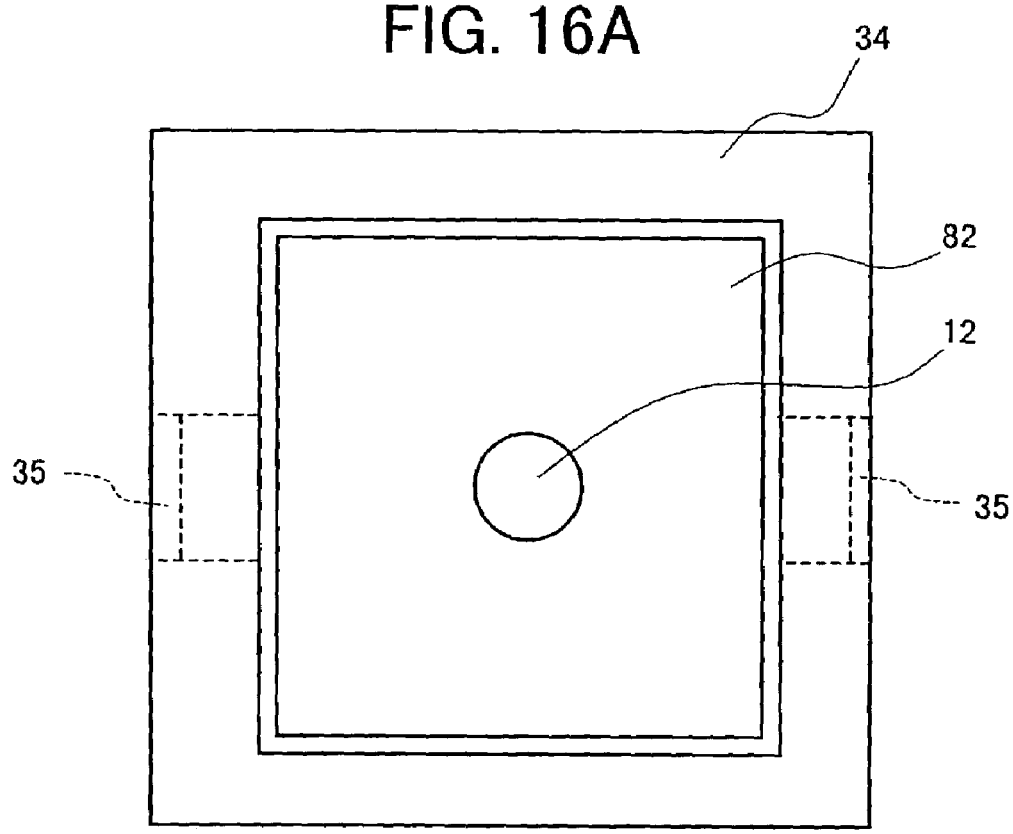

FIG. 16A is a schematic side elevation view of a haptic interface device according to the sixth embodiment. FIG. 16B is a plan view of the haptic interface device in which no information is displayed on the information processing unit in FIG. 16A. The haptic interface device 2 in the present embodiment is integrated with the information processing unit 80. An external connection terminal of the haptic interface device 2 is connected to the information processing unit 80 and a control section 56 can output a detection signal to the external device. An operating section 12 is attached to the information processing unit 80 through a glass plate 34 and arms 35 in such a manner that it can move relative to the information processing unit 80. The image display 82 of the information processing unit 80 is provided right side up and the operating section 12 of the haptic interface device 2 is provided above the image display 82. The main unit of the haptic interface device 2 including a portion of the control section and a portion of a driving section 20 is provided below the information processing unit 80 so as not to obstruct an image displayed on the image display 82. The operating section 12 is placed on a transparent panel, the glass plate 34 in this embodiment, so that information displayed on the image display 82 is visible. The glass plate 34 is supported by at least one set of arms 35 extending from the main unit of the device 2. In the present embodiment, an operating force applied to the operating section 12 is transmitted to detection means within the apparatus through the operating section 12, glass plate 34, and arms 35 and, at the same time, a driving force generated in the haptic interface device 2 is transmitted to the operating section 12.

Figure 17A:
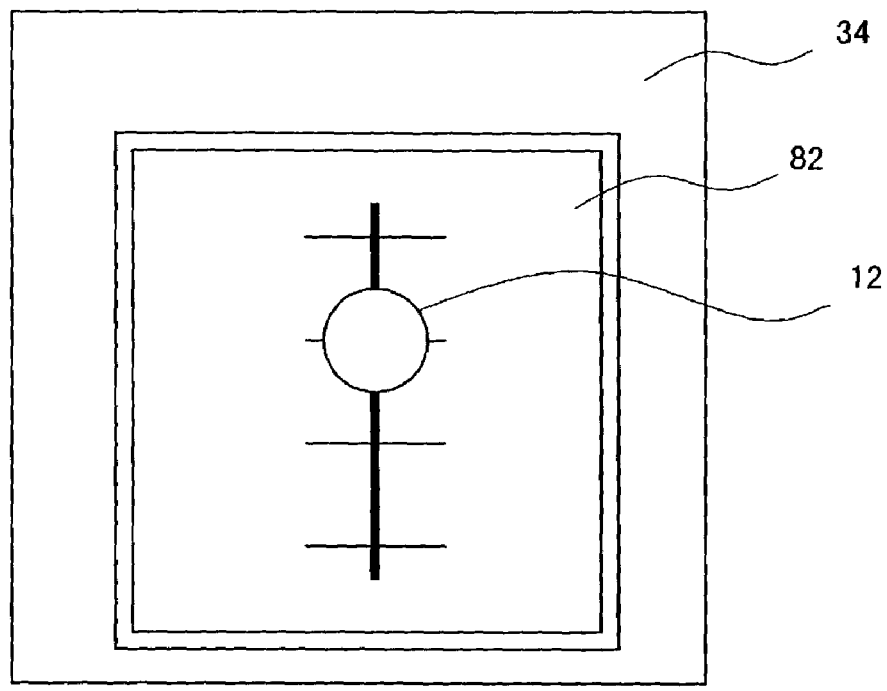
FIGS. 17A–17B shows a sample display screen showing the relationship between a sliding switch displayed by the information processing unit containing the haptic interface device according to the sixth embodiment and an operating section.

Operations according to the present embodiment will be described with reference to FIG. 17. FIG. 17 shows an example in which the information processing unit 80 displays a sliding switch. When the operating section 12 is positioned in the center of the device 2, the information processing unit 80 can identify that position from a detection signal sent from a control section 40 and displays a sliding switch aligned under the current position of the operating section 12. If the initial position of the operating section 12 is the second level from the top of the displayed sliding switch as shown in FIG. 17A, the information processing unit 80 moves the operating section 12 relative to the sliding switch so that it comes to the second level of the displayed sliding switch. On the other hand, when the control section 40 recognizes, based on a signal sent from the information processing unit 80, that the sliding switch is displayed, the control section 40 controls the driving section 20 based on interface definition information associated with the sliding switch.

Figure 17B:
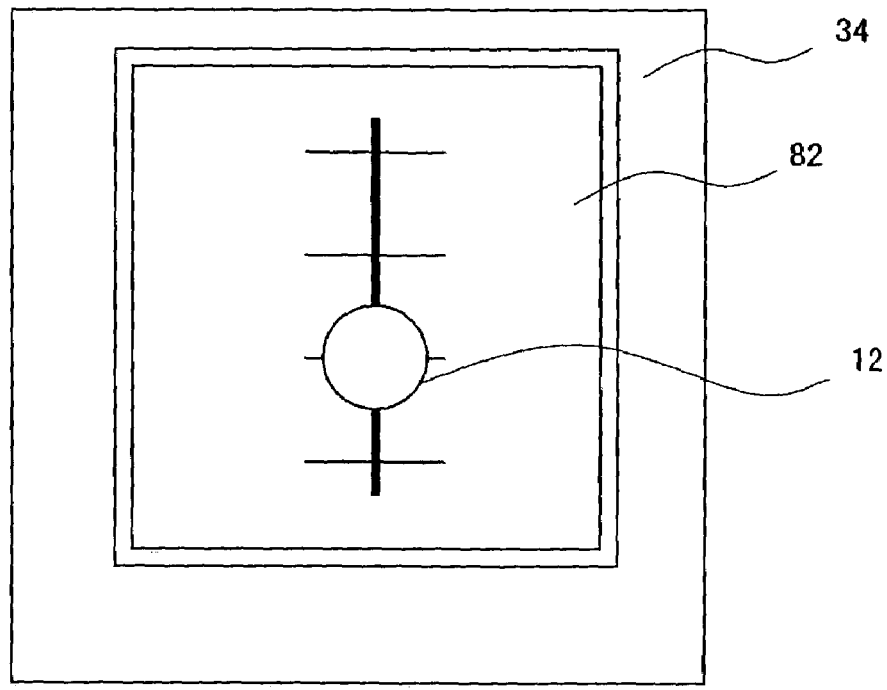

When the operator operates the operating section 12 in order to move it to the third level from the bottom of the switch, the control section 40 provides an operational sensation to an operator as described with respect to the embodiments described above, and outputs a detection section detected by the detection signal to the information processing unit 80 thorough the external connection terminal 4. The operational sensation provided to the operator by the control section 40 is in this case a sensation as if the operator were depressing the operating section. The information processing unit 80 to which the detection signal sent from the control section 40 is input moves the operating section 12 relative to the sliding switch to the third level of the displayed sliding switch according to the detection signal. FIG. 17B shows this state. In FIG. 17, it appears as if the information processing unit 80 had moved. In fact, the operating section 12 moves relative to it as described above.

FIG. 18 shows an example in which the information processing unit 80 displays a jog dial. When the operating section 12 is positioned in the center of the apparatus 2, the information processing unit 80 can recognize the position from a detection signal sent form the control section 4 and display the jog dial aligned under the current position of the operating section 12. As with the sliding switch, the operating section 12 is relatively moved to its initial position. On the other hand, when the control section 40 recognizes, based on a signal sent from the information processing unit 80, that the jog dial is displayed, the control section 40 controls the driving section 20 based on interface definition information associated with the jog dial.

Figure 18A:
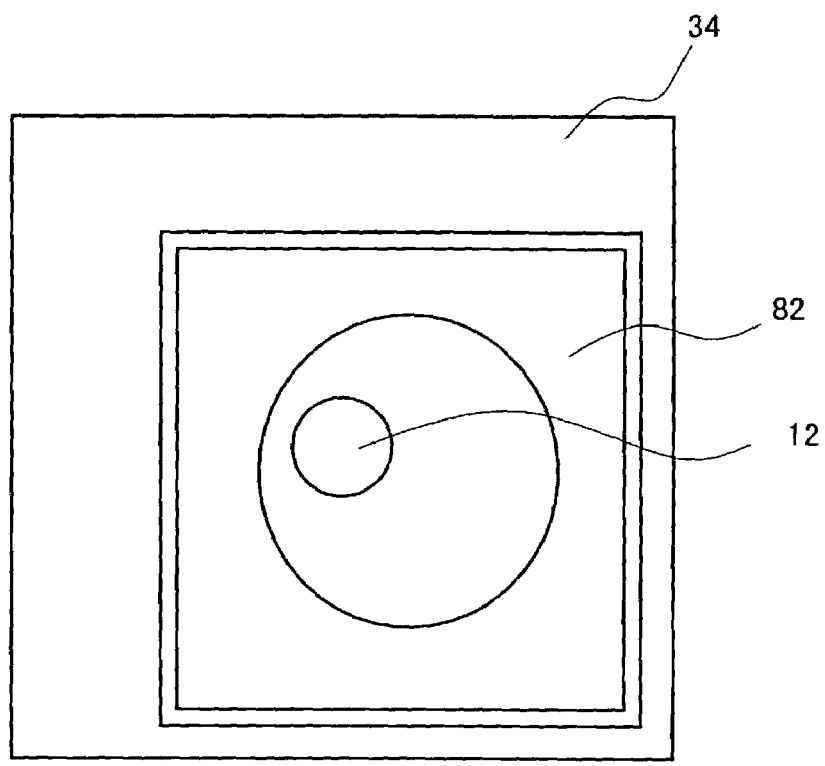
FIG. 18A–18B shows a sample display screen showing the relationship between a jog dial displayed by the information processing unit containing the haptic interface device according to the sixth embodiment and the operating section.
Figure 18B:
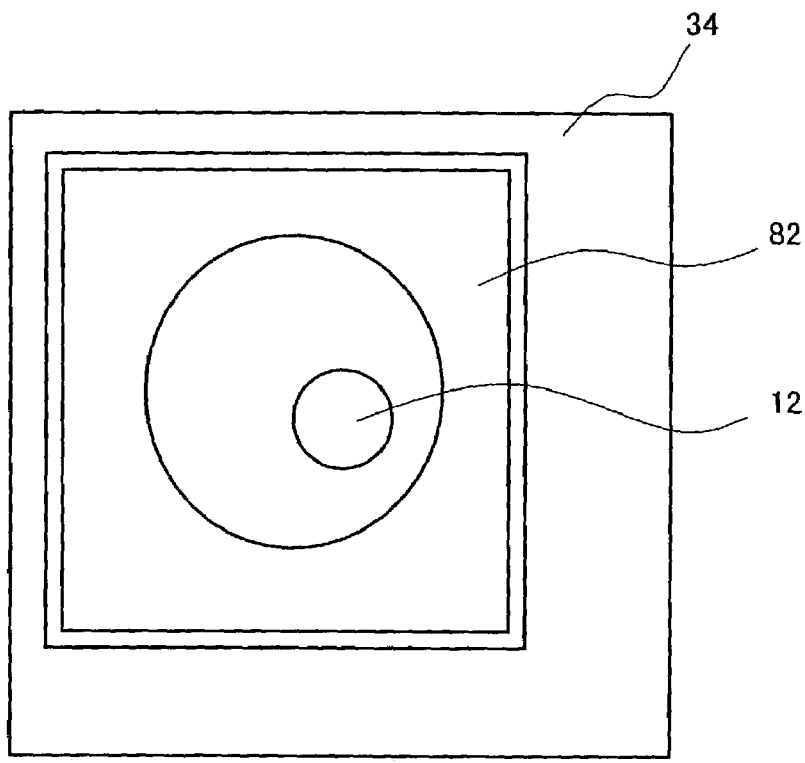

If the operator operates the operating section 12 in order to turn it 180 degrees from the position indicated in FIG. 18A, for example, the control section 40 provides a detection signal detected by the detection section to the information processing unit 80 through the external connection terminal 4. The control section 40 provides an operational feeling to the operator as if he or she were turning the operating section in the direction of the turn. The information processing unit 80 to which the detection signal sent from the control section 40 is input causes relative movement of the operating section 12 as if the displayed jog dial were turned 180 degree according to the operation performed by the operator. FIG. 18B shows this state. In FIG. 18B, it appears as if the information processing unit 80 had moved. In fact, the operating section 12 moves relatively as described above.

According to the present embodiment, the haptic interface device 2 can output a detection signal to an external device and receive information concerning a display image sent from the external device to cooperate with the external device, the information processing unit that displays the image. Furthermore, because the operating section is provided over the display screen, sense of unity of the display image and the operating section is produced and a visual illusion can be provided to the operator that the switch exists in that position.

Seventh Embodiment

The fifth embodiment has been described with respect to an example in which the haptic interface device is applied to the automobile steering wheel. A seventh embodiment will be described with respect to an example in which the external device is a microwave with an oven grill. The functional blocks of a haptic interface device in the present invention are the same as those shown in FIG. 13.

Figure 19:
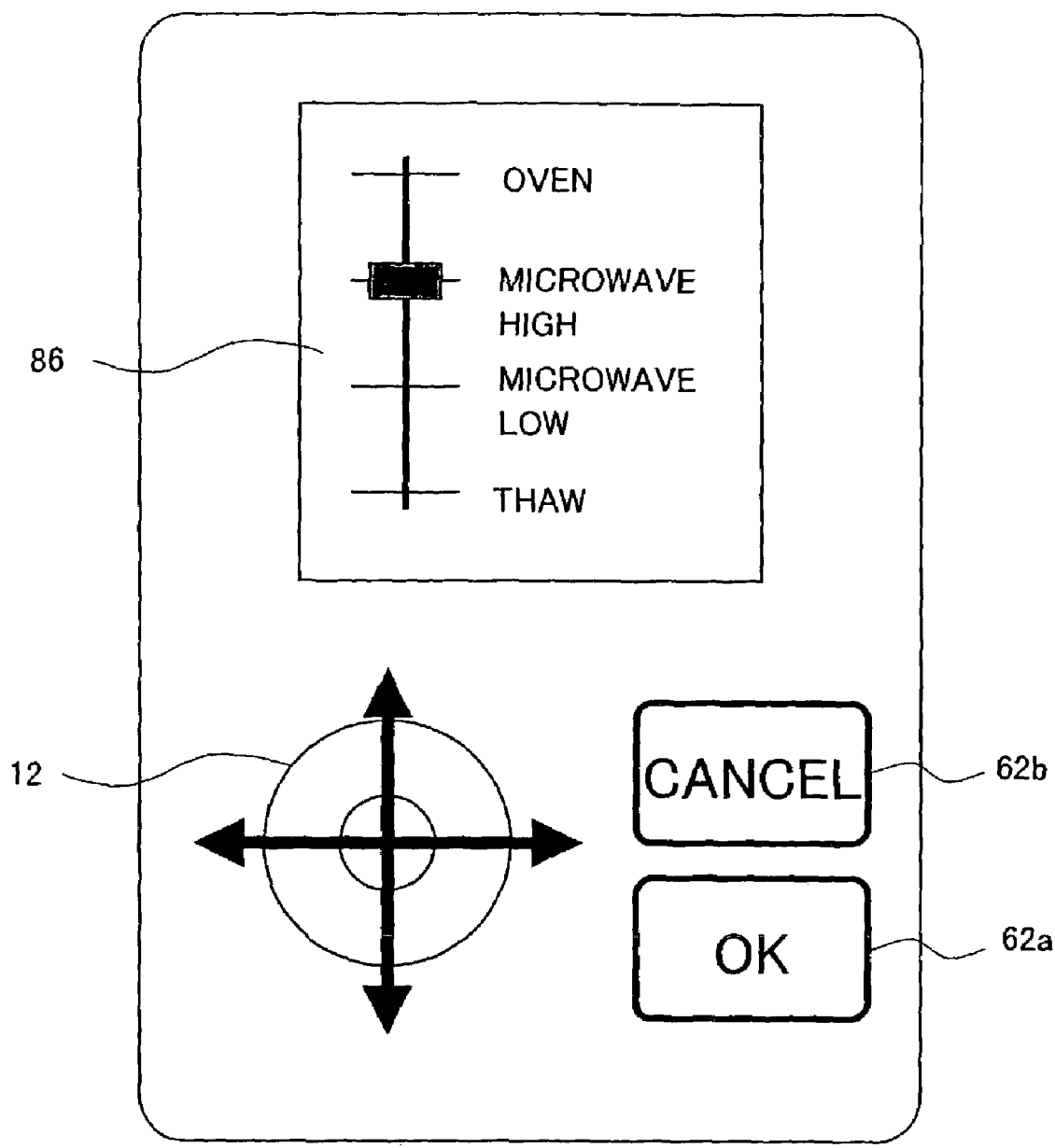
FIG. 19 is a schematic diagram showing the operation panel of an oven containing a haptic interface device according to a seventh embodiment of the present invention.

FIG. 19 is a schematic diagram of the operation panel of a microwave oven containing the haptic interface device according to the seventh embodiment. Because the microwave oven is operated by following a procedural flow, mode transition should be caused in a hierarchical manner. Transition from one layer to the next layer is performed when an OK or Cancel button shown in FIG. 19 is pressed. In the present embodiment, an interface selecting section 62 is equivalent to the OK/Cancel buttons. Shown in FIG. 19 are a display panel 86, the operating section 12 of the haptic interface device, and the OK/Cancel buttons 62a, 62b implemented by the interface selecting section 62. The display panel 86 is equivalent to the image display of the image processing unit described with respect to the sixth embodiment. The information processing unit and the control section and driving section of the haptic interface device are contained in the housing of the microwave oven.

Figure 20:
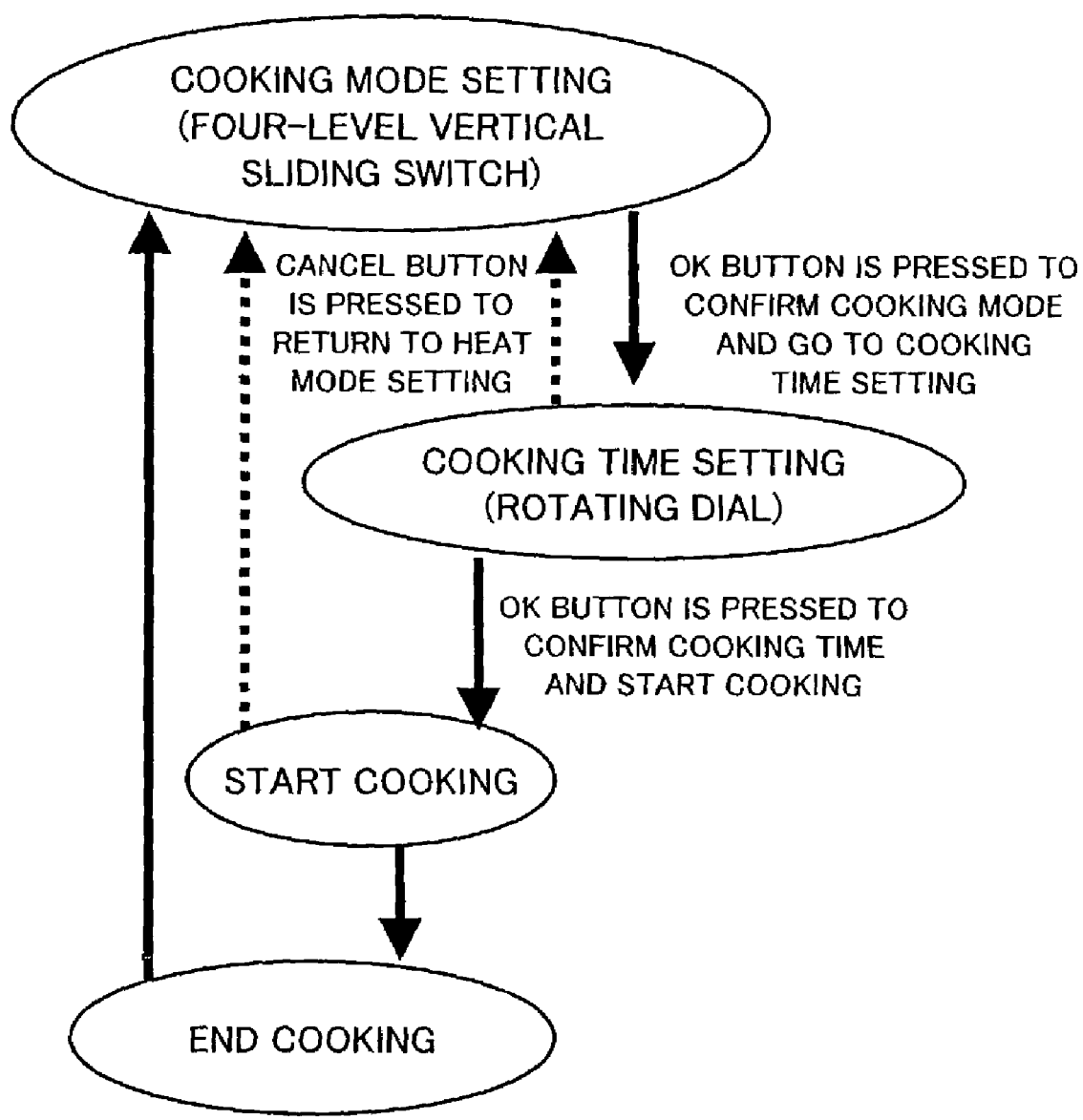
FIG. 20 shows transitions of the operation mode of the haptic interface device according to the seventh embodiment.

FIG. 20 shows operation mode transition in the haptic interface device in the present embodiment. Operations according to the present embodiment will be described below.

In the initial state, a cooking mode selection screen is displayed on the display panel 86 with a four-level vertical sliding switch as shown in FIG. 19. An operator operates the operating section 12 according to the display on the display panel 86 to select a desired cooking mode. Operation control of the operating section, display control of the display panel 86, and cooperation of the information processing unit and the haptic interface device are the same those in the sixth embodiment and therefore their description will not be repeated. In the seventh embodiment, in which the display screen and operating section are not integrated with each other, they cooperate as follows. For example, when the operator wants to move downward the sliding knob movable on the sliding switch, he or she applies an operating force to the operating section 12 downward. Accordingly, the information processing unit move the displayed sliding knob downward based on a detection signal sent from the control section.

If the OK button 62a is pressed while the sliding knob is at the "Microwave High" position, transition to cooking time setting mode takes place as shown in FIG. 20. Accordingly, the information processing unit displays a cooking time setting screen (digital clock, for example). In response to a signal sent from the information processing unit, the control section controls the driving section to cause the operating section 12, which is providing an operational feeling of the sliding switch, to provide an operational feeling of a jog dial. Typically, turning a jog dial clockwise increases cooking time and turning it counterclockwise decreases cooking time. Therefore, the present embodiment conforms to this operating practice. Furthermore, cooking is started when the OK button 62a is pressed and the initial state is recovered on the completion of the cooking.

According to the present embodiment, the haptic interface device, if incorporated into the operation panel of a microwave oven, can provide operational feelings equivalent to those of real switches such as a sliding switch and a jog dial by the single operating section 12. This can reduce the size of the operation panel.

While the OK button 62a is provided separately in the present embodiment, the OK button 62a may be provided on the operating section 12. In that case, the number of manual operations can be reduced, thereby further improving operability.

Eighth Embodiment

An eighth embodiment will be described with respect to an example in which the external device is a copy machine. The functional blocks of the haptic interface device of the eighth embodiment is the same as those shown in FIG. 13.

In recent copy machines, multiple functions are performed by operations on a single touch panel. The operability of the machine can be significantly improved by using a haptic interface device according to the present embodiment for selecting among the multiple functions.

Figure 21:
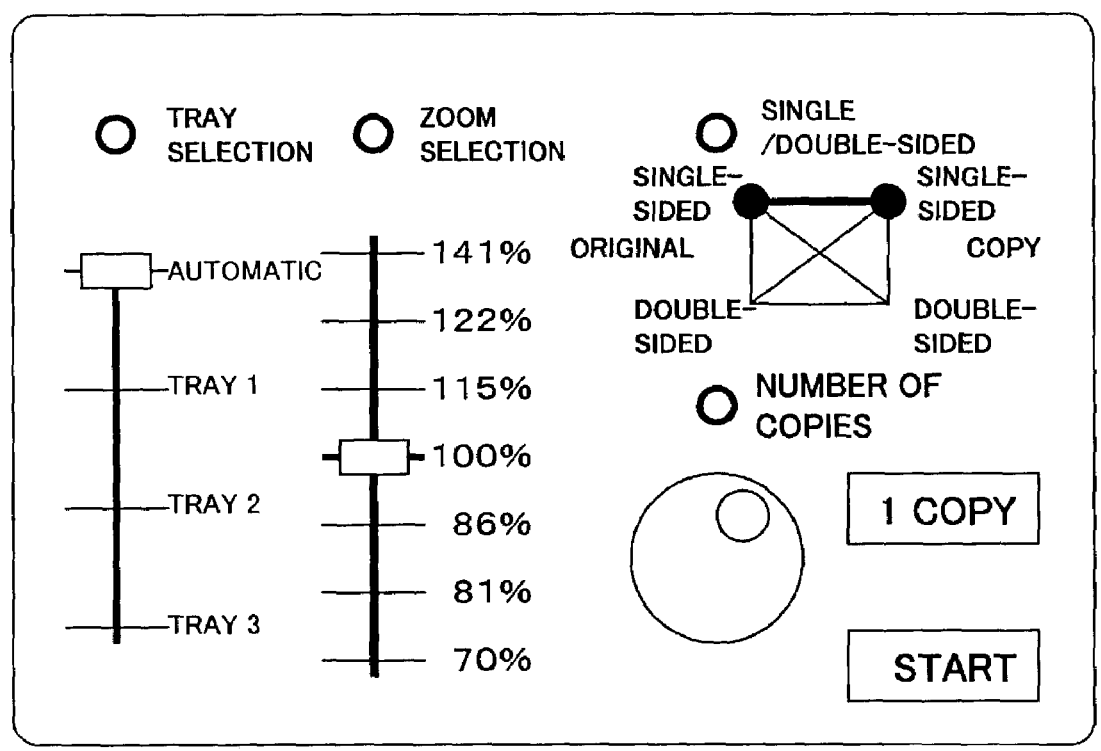
FIG. 21 is a schematic view showing the operation panel of a copy machine containing a haptic interface device according to an eighth embodiment of the present invention.
Figure 22A:
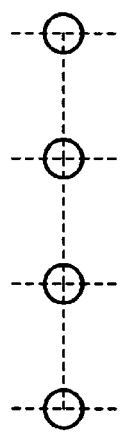
FIGS. 22A to 22D are conceptual diagram showing the retention positions of the interface apparatus shown in FIG. 21.
Figure 22B:
Figure 22C:
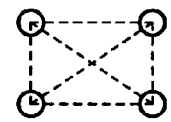
Figure 22D:
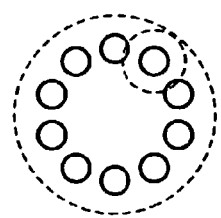

FIG. 21 is a schematic diagram of the operation panel of a copy machine containing the haptic interface device of the present embodiment. By using the operation panel shown in FIG. 21, tray selection, zoom selection, single-sided or double-sided copy selection, and setting of the number of copies can be performed. Each mode can be selected by a selection button (not shown) implemented by an interface selecting section 62. Alternatively, each mode may be selected using pointing devices to click on a region allocated to each mode or a touch panel image display may be provided so that each mode can be selected by a touch operation. In the present embodiment, an operating section 12, which is not shown in FIG. 21, may be provided in the vicinity of the operation panel or attached to a mouse. The operability can be further improved by attaching the interface selecting section 62 and operating section 12 to the same mouse.

Tray selection and zoom selection in FIG. 21 are accomplished by using vertical sliding switches having different numbers of levels (retention points). Single-sided/double-sided copy can be selected by using a horizontal slicing switch in combination with a vertical toggle switch. The number of copies can be set by using a jog dial. A control section 56 controls a driving section 20 based on interface definition information associated with an interface apparatus selected by the interface selecting section 62, as described with respect to the foregoing embodiments. FIG. 22 shows retention points set in interface definition information associated with each of the interface apparatuses shown in FIG. 21. Operations of the sliding switches and the jog dial are the same as those detailed with respect to the second and third embodiments. Selection between single-sided and double-sided copy will be described below with reference to FIG. 23.

FIG. 23 extracts and shows only the interface apparatus for selecting single-sided/double-sided copy, which is shown in FIG. 21. In FIG. 23A, the retention point indicating a single-sided original and the retention point indicating a single-sided copy are connected with each other with a solid line, showing that single-side copying a single-sided original is selected. In this state, constraint forces are applied to the operating section 12 so that it can slide between the single-sided original position and the single-sided copy position. If the operator desires to change the single-sided original setting to the double-sided original setting, he or she moves the operating section 12 in the direction indicated by arrow 6a against the constraint forces. As a result, the display on the display screen changes to a display as shown in FIG. 23B and simultaneously constraint forces are applied to the operating section 12 in the direction indicated by arrows 6c and 6d on the diagonal line connecting the double-sided original position and the single-sided copy position, as shown in FIG. 23C. Operations for changing from single-sided copying to double-sided copying, and vice verse are the same as the operations described above, except that the direction is opposite, therefore the description of which will be omitted. The control section 56 controls the driving section 20 based on this specification information. The specification information is of course included in interface definition information associated with the single-sided/double-sided copy interface apparatus.

The specification information corresponding to FIG. 23A and the specification information corresponding to FIG. 23B are included in the same interface definition information. According to the present embodiment, the haptic interface device can be applied to the interface apparatuses on the operation panel of the copying machine.

Ninth Embodiment

The seventh embodiment has been described with respect to an example in which the haptic interface device is combined with the information processing unit having the function of displaying information as an external device. A ninth embodiment will be described with respect to an example in which a haptic interface device has an audio output apparatus attached to it or used with combination to an information processing device that outputs sound. The functional blocks of the haptic interface device according to the ninth embodiment are the same as those shown in FIG. 13.

As described above, the status of operation or position of an operating section 12 is detected and signals indicating this information are sent to the information processing unit, which outputs sound representing the state of the operating section according to the position and the speed and acceleration of movement of the operating section 12 that it recognizes from the detection signal. For example, the information processing unit generates a low-frequency sound when the motion of the operating section 12 is slow, outputs a high-frequency sound when the motion of the operating section 12 is fast, and generates an alert sound if the operating section 12 enters a forbidden position.

The information processing unit also can count the number of the same operations performed at the same position and generate different sounds according to the value. For example, the information processing unit can generate different clicking sounds when the point of a retractable ballpoint pen is pushed out and when it is retracted. At the same time, the information processing unit sends a signal indicating the state to a control section 56. The control section 56 selects and uses different pieces of specification information according to whether the point is pushed out or retracted and provides, in synchronization with the clicking sound, different operational feelings when the point is pushed out and retracted. In this way, the control section 56 can use different pieces of specification information based on signals sent from the external device when the same operation is performed on the operating section 12 at the same position.

Operations in the embodiments for providing different operational feelings of different interface apparatuses have been described. In the embodiments described above, most of the movements of the operating section 12 are two-dimensional. Therefore, the operating section 12 can be implemented by a two-dimensional actuator as described with respect to the first embodiment. The two-dimensional actuator can be used in combination with a pressure sensor that detects depression pressure to provide a touch panel interface apparatus, and provide various operational feelings by switching between different sets of specification information according to depression pressure. Moreover, different types of interface apparatuses can be provided by a single operating section 12. Furthermore, different operational feelings such as a viscous feeling and inertial feeling can be provided to the operator by the same interface apparatus.

What is claimed is:

1. A haptic interface device comprising:
   operating means operated by an operator;
   driving means for providing a driving force to said operating means to provide a reaction force to the operator;
   detection means for detecting the state of operation performed on said operating means by the operator or the position of said operating means within the range of movement of said operating means and outputting said state or position as a signal;
   control means for controlling said driving means according to the signal output from said detection means and based on interface definition information defining specification information for said operating means to behave as an interface apparatus;
   storage means for storing said interface definition information about a plurality of interface apparatus; and
   interface selecting means for selecting an interface apparatus which said operating means is behaving,
   said control means switches interface definition information used for controlling said driving means to interface definition information associated with the interface apparatus selected using said interface selecting means,
   wherein said haptic interface device provides a reaction force corresponding to the state of operation or position of said operating means that is detected by said detection means.

2. The haptic interface device according to claim 1, wherein,
   said control means have operation determination section for identifying the state of operation by the operator based on the signal output from said detection means.

3. The haptic interface device according to claim 2, wherein,
   said storage means stores interface definition information in which a plurality of sets of specification information for said operating means to behave as one interface apparatus is defined; and
   said control means performs switching to a set of specification information corresponding to the state of operation identified by said operation determination section to control said driving means.

4. The haptic interface device according to claim 1, wherein
   said operating means are moved in a substantially two-dimensional plane within the range of movement of said operating means.

5. The haptic interface device according to claim 4, wherein
   said control means controls said driving means based on interface definition information such that said operating means are constrained onto a predetermined approximately straight line within a substantially two-dimensional plane.

6. The haptic interface device according to claim 4, wherein
   said control means controls said driving means based on interface definition information such that said operating means are constrained onto a predetermined approximate circle in a substantially two-dimensional plane.

7. The haptic interface device according to claim 1, wherein
   said interface selecting means are integrated with said operating means.

8. The haptic interface device according to claim 1, wherein
   said detection means detects depression pressure applied to said operating means.

9. The haptic interface device according to claim 8, wherein
   said control means performs switching to specification information corresponding to the depression pressure of the displacement of the pressure detected by said detection means in order to control said driving means.

10. The haptic interface device according to claim 1, further comprising:
    an external connection terminal through which a signal detected by said detection means is output.

11. The haptic interface device according to claim 10, wherein
    said control means selects a signal to be output through said external connection terminal based on a determination made by said operation determination section.

12. The haptic interface device according to claim 10, wherein
    said control means outputs a signal sent from said detection means to an image display device to cause said image display device to display an image of an interface apparatus being behaved by said operating means, said image display device being an external device.

13. The haptic interface device according to claim 12, wherein
    said operating means are provided above the screen of said image display apparatus.

14. The haptic interface device according to claim 10, wherein
    said control means outputs a signal sent from said detection means to an audio output device to cause said audio output device to output a sound corresponding to that which would be generated by the interface apparatus being behaved by said operating means in response to an operation by the operator, said audio output device being an external device.

* * * * *